US012680639B2

(12) United States Patent
Ciccone et al.

(10) Patent No.: US 12,680,639 B2
(45) Date of Patent: Jul. 14, 2026

(54) GENDERLESS ASEPTIC CONNECTOR

(71) Applicant: WilMarc Holdings, LLC, Fort Collins, CO (US)

(72) Inventors: Paul C. Ciccone, Wellington, CO (US); William A. Coulson, Fort Collins, CO (US); Marcia Coulson, Fort Collins, CO (US)

(73) Assignee: WilMarc Holdings, LLC, Fort Collins, CO (US)

( * ) Notice: Subject to any disclaimer, the term of this patent is extended or adjusted under 35 U.S.C. 154(b) by 221 days.

(21) Appl. No.: 17/365,085

(22) Filed: Jul. 1, 2021

(65) Prior Publication Data

US 2023/0003324 A1 Jan. 5, 2023

(51) Int. Cl.
| | |
|---|---|
| *F16L 37/113* | (2006.01) |
| *F16L 37/084* | (2006.01) |
| *F16L 37/36* | (2006.01) |

(52) U.S. Cl.
CPC ......... *F16L 37/113* (2013.01); *F16L 37/0841* (2013.01); *F16L 37/36* (2013.01); *F16L 2201/44* (2013.01)

(58) Field of Classification Search
CPC ....... F16L 2201/44; F16L 39/00; F16L 37/56; F16L 37/36; F16L 37/113; F16L 37/252; F16L 37/0841
See application file for complete search history.

(56) References Cited

U.S. PATENT DOCUMENTS

| | | | |
|---|---|---|---|
| 964,310 | A | 7/1910 | Perazio |
| 2,208,286 | A | 7/1940 | Berger |
| 2,218,318 | A | 10/1940 | Pfauser |
| 2,263,293 | A | 11/1941 | Ewald |
| 2,304,390 | A | 12/1942 | Wolfram |
| 2,451,218 | A | 10/1948 | Hengst |
| 2,456,045 | A | 12/1948 | Brock |
| 2,545,796 | A | 3/1951 | Scheiwer |
| 2,648,548 | A | 8/1953 | Scheiwer |
| 2,777,716 | A | 1/1957 | Gray |
| 2,805,089 | A | 9/1957 | Hansen |

(Continued)

FOREIGN PATENT DOCUMENTS

| | | |
|---|---|---|
| CA | 1 021 656 | 11/1977 |
| CA | 1084551 | 8/1980 |

(Continued)

OTHER PUBLICATIONS

CPC. Aseptiquik® G Series Connectors. Specification List. Website, https://www.cpcworldwide.com, originally downloaded Mar. 28, 2023, 2 pages.

(Continued)

*Primary Examiner* — Matthew Troutman
*Assistant Examiner* — Fannie Kee
(74) *Attorney, Agent, or Firm* — Craig R. Miles; CR MILES P.C.

(57) ABSTRACT

A connector system including a plurality of connectors having substantially identical structure each defining a pair of fluid conduits wherein a first one of the pair of fluid conduits terminating in a male fitting and a second one of said pair fluid conduits terminating in a female fitting wherein the male fitting and the female fitting of a pair of connectors mate in a fluid transmission connection.

18 Claims, 17 Drawing Sheets

(56) References Cited

U.S. PATENT DOCUMENTS

| | | | |
|---|---|---|---|
| 2,854,259 A | 9/1958 | Clark | |
| 2,951,713 A | 9/1960 | Hoffstrom | |
| 3,279,497 A * | 10/1966 | Supinger | F16L 37/36 |
| | | | 251/348 |
| 3,291,152 A | 12/1966 | Comer | |
| 3,382,892 A * | 5/1968 | Cerbin | F16L 37/113 |
| | | | 285/70 |
| 3,460,801 A | 8/1969 | Norton | |
| 3,592,231 A | 7/1971 | Lamb | |
| 3,719,194 A | 3/1973 | Anderson et al. | |
| 3,847,413 A | 11/1974 | Gurley et al. | |
| 3,916,929 A | 11/1975 | Brown | |
| 4,019,512 A | 4/1977 | Tenczar | |
| 4,187,846 A | 2/1980 | Lolachi et al. | |
| 4,220,174 A | 9/1980 | Spitz | |
| 4,415,085 A | 11/1983 | Clarke et al. | |
| 4,436,125 A | 3/1984 | Blenkush | |
| 4,500,118 A | 2/1985 | Blenkush | |
| 4,541,457 A | 9/1985 | Blenkush | |
| 4,543,993 A | 10/1985 | Calvin et al. | |
| 4,576,359 A | 3/1986 | Oetiker | |
| 4,625,761 A | 12/1986 | Uchida et al. | |
| 4,630,847 A | 12/1986 | Blenkush | |
| 4,676,778 A | 6/1987 | Nelson, Jr. | |
| 4,703,957 A | 11/1987 | Blenkush | |
| 4,703,958 A | 11/1987 | Fremy | |
| 4,733,692 A | 3/1988 | Kotake et al. | |
| 4,753,268 A * | 6/1988 | Palau | F16L 37/0841 |
| | | | 285/914 |
| 4,819,692 A | 4/1989 | Olson et al. | |
| 4,877,145 A | 10/1989 | Manner | |
| 4,903,995 A | 2/1990 | Blenkush et al. | |
| 4,934,655 A | 6/1990 | Blenkush et al. | |
| 4,946,200 A | 8/1990 | Blenkush et al. | |
| 4,953,592 A | 9/1990 | Takahashi et al. | |
| 4,982,736 A * | 1/1991 | Schneider | F16L 37/56 |
| | | | 607/104 |
| 5,009,252 A | 4/1991 | Faughn | |
| 5,033,777 A | 7/1991 | Blenkush | |
| 5,052,725 A | 10/1991 | Meyer et al. | |
| 5,076,615 A | 12/1991 | Sampson | |
| 5,104,158 A | 4/1992 | Meyer et al. | |
| 5,137,527 A | 8/1992 | Miller et al. | |
| 5,165,733 A | 11/1992 | Sampson | |
| 5,178,303 A | 1/1993 | Blenkush et al. | |
| D339,417 S | 9/1993 | Sampson et al. | |
| 5,259,894 A | 11/1993 | Sampson | |
| 5,295,339 A | 3/1994 | Manner | |
| 5,316,041 A | 5/1994 | Ramacier, Jr. et al. | |
| 5,353,836 A | 10/1994 | deCler et al. | |
| 5,390,702 A | 2/1995 | Smith, III | |
| D357,307 S | 4/1995 | Ramacier, Jr. et al. | |
| 5,460,413 A | 10/1995 | Sampson | |
| 5,494,074 A | 2/1996 | Ramacier, Jr. et al. | |
| 5,529,085 A | 6/1996 | Richards et al. | |
| D372,093 S | 7/1996 | Sampson et al. | |
| 5,546,985 A | 8/1996 | Bartholomew | |
| D375,160 S | 10/1996 | Sampson et al. | |
| 5,564,752 A | 10/1996 | Sampson | |
| 5,639,064 A | 6/1997 | deCler et al. | |
| D384,731 S | 10/1997 | Ramacier, Jr. et al. | |
| 5,695,221 A | 12/1997 | Sunderhaus | |
| D388,876 S | 1/1998 | Sampson | |
| 5,704,106 A | 1/1998 | Sampson et al. | |
| 5,799,987 A | 9/1998 | Sampson | |
| 5,820,614 A | 10/1998 | Erskine et al. | |
| 5,826,610 A | 10/1998 | Bodhaine | |
| 5,837,180 A | 11/1998 | Linder et al. | |
| 5,845,943 A | 12/1998 | Ramacier, Jr. et al. | |
| 5,848,811 A | 12/1998 | Sampson | |
| 5,848,997 A | 12/1998 | Erskine et al. | |
| 5,869,803 A | 2/1999 | Noguchi et al. | |
| 5,911,403 A | 6/1999 | deCler et al. | |
| 5,937,885 A | 8/1999 | Sampson | |
| 5,938,244 A | 8/1999 | Meyer | |
| 5,975,489 A | 11/1999 | deCler et al. | |
| 6,024,124 A | 2/2000 | Braun et al. | |
| 6,050,297 A | 4/2000 | Ostrowski et al. | |
| 6,082,401 A | 7/2000 | Braun et al. | |
| 6,095,191 A | 8/2000 | Smith, III | |
| 6,146,374 A | 11/2000 | Erskine et al. | |
| 6,161,578 A | 12/2000 | Braun et al. | |
| 6,206,040 B1 | 3/2001 | Smith, III | |
| 6,231,089 B1 | 5/2001 | deCler et al. | |
| 6,341,803 B1 * | 1/2002 | Allen, III | F16L 39/00 |
| | | | 285/39 |
| 6,382,593 B1 | 5/2002 | deCler et al. | |
| 6,412,829 B1 | 7/2002 | Persson | |
| 6,511,100 B1 | 1/2003 | Le Clinche | |
| 6,557,824 B1 | 5/2003 | Jenski, Jr. et al. | |
| 6,581,907 B1 | 6/2003 | Kuwabara et al. | |
| 6,607,097 B2 | 8/2003 | Savage et al. | |
| 6,626,419 B2 | 9/2003 | deCler et al. | |
| 6,649,829 B2 | 11/2003 | Garber et al. | |
| 6,705,591 B2 | 3/2004 | deCler | |
| 6,848,602 B2 | 2/2005 | deCler et al. | |
| 6,871,669 B2 | 3/2005 | Meyer et al. | |
| D503,778 S | 4/2005 | Wicks | |
| 6,886,803 B2 | 5/2005 | Mikiya et al. | |
| 6,897,374 B2 | 5/2005 | Garber et al. | |
| 6,902,144 B2 | 6/2005 | deCler | |
| 6,916,007 B2 | 7/2005 | deCler et al. | |
| 6,962,275 B2 | 11/2005 | deCler et al. | |
| 6,978,800 B2 | 12/2005 | deCler et al. | |
| 7,080,665 B2 | 7/2006 | Whall | |
| 7,147,627 B2 | 12/2006 | Kim et al. | |
| 7,163,022 B2 | 1/2007 | Whall | |
| 7,210,917 B2 * | 5/2007 | Lai | F16L 37/36 |
| | | | 264/328.8 |
| 7,316,424 B2 | 1/2008 | Kardeis et al. | |
| 7,384,783 B2 | 6/2008 | Kunas et al. | |
| 7,394,375 B2 | 7/2008 | Johnson | |
| 7,434,842 B2 | 10/2008 | Schmidt | |
| 7,448,653 B2 | 11/2008 | Jensen et al. | |
| 7,469,472 B2 | 12/2008 | deCler et al. | |
| 7,488,446 B2 | 2/2009 | Meyer et al. | |
| 7,514,025 B2 | 4/2009 | Hofmann et al. | |
| 7,544,191 B2 | 6/2009 | Peluso et al. | |
| 7,546,857 B2 | 6/2009 | Chadbourne et al. | |
| 7,547,047 B2 | 6/2009 | deCler et al. | |
| 7,562,906 B2 | 7/2009 | Schmidt | |
| D602,128 S | 10/2009 | Williams et al. | |
| 7,631,660 B2 | 12/2009 | deCler et al. | |
| 7,647,954 B2 | 1/2010 | Garber et al. | |
| D612,019 S | 3/2010 | Williams et al. | |
| D612,021 S | 3/2010 | Schmidt | |
| 7,695,020 B2 | 4/2010 | Schmidt | |
| 7,708,025 B2 | 5/2010 | Johnson | |
| 7,722,583 B2 | 5/2010 | Kim et al. | |
| 7,757,974 B2 | 7/2010 | Hofmann et al. | |
| 7,770,939 B2 | 8/2010 | Jensen et al. | |
| 7,806,139 B2 | 10/2010 | Packham et al. | |
| 7,828,336 B2 | 11/2010 | Gammons | |
| 7,841,357 B2 | 11/2010 | Rankin | |
| D629,894 S | 12/2010 | Lombardi, III et al. | |
| D630,320 S | 1/2011 | Lombardi, III et al. | |
| 7,875,346 B2 | 1/2011 | Hofmann et al. | |
| 7,878,553 B2 | 2/2011 | Wicks et al. | |
| D634,840 S | 3/2011 | Lombardi, III et al. | |
| 7,901,934 B2 | 3/2011 | Kunas et al. | |
| 7,921,875 B2 | 4/2011 | Moriiki et al. | |
| 7,950,700 B2 | 5/2011 | Willemstyn et al. | |
| D639,398 S | 6/2011 | Wilhelm | |
| 7,954,374 B2 | 6/2011 | Rankin | |
| 7,954,515 B2 | 6/2011 | Gerst | |
| D642,244 S | 7/2011 | Wilhelm | |
| 7,976,072 B2 | 7/2011 | Parrish | |
| D645,547 S | 9/2011 | Lombardi et al. | |
| 8,016,816 B2 | 9/2011 | Gregory | |
| D649,240 S | 11/2011 | Lewis et al. | |
| D649,938 S | 12/2011 | Erickson et al. | |
| D649,939 S | 12/2011 | Erickson et al. | |
| D650,478 S | 12/2011 | Lewis | |
| 8,075,540 B2 | 12/2011 | von Dyck et al. | |

(56) References Cited

U.S. PATENT DOCUMENTS

| | | | |
|---|---|---|---|
| D652,510 S | 1/2012 | Lombardi, III et al. | |
| D652,511 S | 1/2012 | Lombardi, III et al. | |
| D654,573 S | 2/2012 | Lombardi et al. | |
| 8,113,546 B2 | 2/2012 | Jensen et al. | |
| D655,393 S | 3/2012 | Whitaker | |
| 8,162,242 B2 | 4/2012 | Hofmann et al. | |
| 8,187,867 B2 | 5/2012 | Kunas et al. | |
| D663,022 S | 7/2012 | Lombardi, III et al. | |
| 8,235,426 B2 | 8/2012 | Pisula, Jr. et al. | |
| 8,256,803 B2 | 9/2012 | Takahashi | |
| 8,323,255 B2 | 12/2012 | Martino et al. | |
| 8,388,873 B2 | 3/2013 | Hofmann et al. | |
| 8,397,756 B2 | 3/2013 | Packham et al. | |
| 8,448,994 B2 | 5/2013 | Pisula, Jr. et al. | |
| RE44,310 E | 6/2013 | Chadbourne et al. | |
| 8,491,016 B2 | 7/2013 | Williams et al. | |
| 8,596,688 B2 | 12/2013 | Pisula, Jr. et al. | |
| D698,440 S | 1/2014 | Lombardi, III et al. | |
| 8,623,640 B2 | 1/2014 | Kunas et al. | |
| D699,841 S | 2/2014 | Lombardi, III et al. | |
| 8,684,035 B2 | 4/2014 | Bernhard | |
| D712,537 S | 9/2014 | Lombardi et al. | |
| 8,897,756 B2 | 11/2014 | Skog et al. | |
| 8,926,577 B2 | 1/2015 | Nishtala et al. | |
| 8,945,091 B2 | 2/2015 | Williams et al. | |
| D724,703 S | 3/2015 | Downs | |
| 9,027,968 B2 | 5/2015 | Gerst | |
| 9,046,205 B2 | 6/2015 | Whitaker et al. | |
| 9,157,560 B2 | 10/2015 | Rehder et al. | |
| 9,266,257 B2 | 2/2016 | Hofmann et al. | |
| 9,279,530 B2 | 3/2016 | Schmidt | |
| 9,327,893 B2 | 5/2016 | Steele et al. | |
| 9,364,653 B2 | 6/2016 | Williams et al. | |
| 9,371,921 B2 | 6/2016 | Whitaker | |
| D761,395 S | 7/2016 | Plackner et al. | |
| 9,388,929 B2 | 7/2016 | Lewis et al. | |
| D762,826 S | 8/2016 | Plackner et al. | |
| 9,463,110 B2 | 10/2016 | Nishtala et al. | |
| 9,464,741 B2 | 10/2016 | Lewis et al. | |
| 9,498,800 B2 | 11/2016 | Hofmann et al. | |
| 9,506,590 B2 | 11/2016 | Wilhelm et al. | |
| 9,540,606 B2 | 1/2017 | Kunas et al. | |
| 9,770,581 B2 | 9/2017 | Gerst et al. | |
| 9,879,808 B2 | 1/2018 | Williams et al. | |
| 9,901,729 B2 | 2/2018 | Vigna et al. | |
| 10,173,046 B2 | 1/2019 | Ciccone et al. | |
| 10,213,592 B2 | 2/2019 | Gerst et al. | |
| 10,293,150 B2 | 5/2019 | Ciccone et al. | |
| 10,307,583 B2 | 6/2019 | Williams et al. | |
| 10,350,401 B2 | 7/2019 | Ciccone et al. | |
| 10,408,239 B2 * | 9/2019 | Debernardi | F16L 37/56 |
| 10,486,880 B2 | 11/2019 | Franca et al. | |
| 10,583,281 B2 | 3/2020 | Ciccone et al. | |
| 10,632,297 B2 | 4/2020 | Gerst et al. | |
| 10,640,741 B2 | 5/2020 | Kunas et al. | |
| 10,675,454 B2 | 6/2020 | Vigna et al. | |
| 10,871,250 B2 | 12/2020 | Williams et al. | |
| 11,357,963 B2 | 6/2022 | Williams et al. | |
| 11,591,556 B2 | 2/2023 | Kunas et al. | |
| 2001/0035220 A1 | 11/2001 | Russell | |
| 2002/0011730 A1 | 1/2002 | Stickan | |
| 2002/0014608 A1 | 2/2002 | deCler et al. | |
| 2002/0024216 A1 | 2/2002 | Rose et al. | |
| 2002/0063427 A1 | 5/2002 | Schiemann et al. | |
| 2002/0074533 A1 | 6/2002 | DeCler et al. | |
| 2002/0101076 A1 | 8/2002 | Barrier | |
| 2002/0129858 A1 | 9/2002 | Meyer et al. | |
| 2002/0170731 A1 | 11/2002 | Garber et al. | |
| 2002/0190453 A1 | 12/2002 | Wilhelm et al. | |
| 2003/0042734 A1 | 3/2003 | Kuwabara | |
| 2003/0062498 A1 | 4/2003 | DeCler et al. | |
| 2003/0062501 A1 | 4/2003 | DeCler | |
| 2003/0196703 A1 | 10/2003 | DeCler et al. | |
| 2003/0201017 A1 * | 10/2003 | Knuthson | F16L 37/56 137/614.03 |

| | | | |
|---|---|---|---|
| 2004/0016900 A1 | 1/2004 | Kouda | |
| 2004/0079423 A1 | 4/2004 | Mikiya et al. | |
| 2004/0130438 A1 | 7/2004 | Garber | |
| 2004/0169368 A1 | 9/2004 | Garber et al. | |
| 2004/0173769 A1 | 9/2004 | DeCler | |
| 2004/0222180 A1 | 11/2004 | Wicks et al. | |
| 2004/0232175 A1 | 11/2004 | DeCler et al. | |
| 2005/0001425 A1 | 1/2005 | DeCler et al. | |
| 2005/0012330 A1 | 1/2005 | Schmidt | |
| 2005/0057042 A1 | 3/2005 | Wicks | |
| 2005/0076964 A1 | 4/2005 | Whall | |
| 2005/0082828 A1 | 4/2005 | Wicks et al. | |
| 2005/0084410 A1 | 4/2005 | Meyer et al. | |
| 2005/0127117 A1 | 6/2005 | deCler et al. | |
| 2005/0211934 A1 | 9/2005 | Garber et al. | |
| 2005/0237241 A1 | 10/2005 | Garber et al. | |
| 2005/0247371 A1 | 11/2005 | Chadbourne et al. | |
| 2006/0048849 A1 | 3/2006 | DeCler | |
| 2006/0076419 A1 | 4/2006 | Johnson | |
| 2006/0138704 A1 | 6/2006 | DeCler et al. | |
| 2006/0186233 A1 | 8/2006 | Holm et al. | |
| 2006/0196556 A1 | 9/2006 | Johnson | |
| 2006/0207345 A1 | 9/2006 | Rankin | |
| 2006/0231137 A1 | 10/2006 | Whall | |
| 2007/0001452 A1 | 1/2007 | Friel | |
| 2007/0025811 A1 | 2/2007 | Wilhelm | |
| 2007/0102051 A1 | 5/2007 | Zeiber et al. | |
| 2007/0169825 A1 | 7/2007 | Packham et al. | |
| 2007/0209716 A1 | 9/2007 | Rankin | |
| 2007/0259246 A1 | 11/2007 | Jang et al. | |
| 2008/0001395 A1 | 1/2008 | Kouda | |
| 2008/0011785 A1 | 1/2008 | Braun et al. | |
| 2008/0061553 A1 | 3/2008 | Schmidt | |
| 2008/0067807 A1 | 3/2008 | DeCler et al. | |
| 2008/0191069 A1 | 8/2008 | Hofmann et al. | |
| 2008/0277924 A1 | 11/2008 | Jensen et al. | |
| 2008/0290657 A1 * | 11/2008 | Mckeon, III | F16L 39/00 285/80 |
| 2009/0021007 A1 | 1/2009 | Le Bars et al. | |
| 2009/0030387 A1 | 1/2009 | Kim et al. | |
| 2009/0051161 A1 * | 2/2009 | Ekstrom | F16L 39/00 285/29 |
| 2009/0167018 A1 | 7/2009 | Lien | |
| 2009/0188575 A1 | 7/2009 | Williams et al. | |
| 2009/0256355 A1 | 10/2009 | Wicks et al. | |
| 2009/0261582 A1 | 10/2009 | Gaudin | |
| 2009/0284007 A1 | 11/2009 | Schmidt | |
| 2010/0001516 A1 | 1/2010 | Pisula, Jr. et al. | |
| 2010/0006157 A1 | 1/2010 | Gerst | |
| 2010/0006162 A1 | 1/2010 | Rankin | |
| 2010/0019487 A1 | 1/2010 | deCler et al. | |
| 2010/0043988 A1 | 2/2010 | Hofmann et al. | |
| 2010/0127492 A1 | 5/2010 | Poder et al. | |
| 2010/0155979 A1 | 6/2010 | Hofmann et al. | |
| 2010/0230950 A1 | 9/2010 | Williams et al. | |
| 2010/0295295 A1 | 11/2010 | Schmidt | |
| 2010/0301599 A1 | 12/2010 | Jensen et al. | |
| 2011/0012340 A1 | 1/2011 | Packham et al. | |
| 2011/0062701 A1 | 3/2011 | Downs et al. | |
| 2011/0121035 A1 | 5/2011 | Greter et al. | |
| 2011/0127767 A1 | 6/2011 | Wicks et al. | |
| 2011/0204621 A1 | 8/2011 | Whitaker et al. | |
| 2011/0204622 A1 | 8/2011 | Lewis et al. | |
| 2011/0210541 A1 * | 9/2011 | Lewis | F16L 37/56 285/317 |
| 2011/0240158 A1 | 10/2011 | Py | |
| 2011/0295236 A1 | 12/2011 | Gregory | |
| 2012/0031515 A1 | 2/2012 | Whitaker | |
| 2012/0068457 A1 | 3/2012 | Pisula, Jr. et al. | |
| 2012/0161051 A1 | 6/2012 | Williams et al. | |
| 2012/0179052 A1 | 7/2012 | Wilhelm et al. | |
| 2012/0259237 A1 | 10/2012 | Axelrod | |
| 2013/0030387 A1 | 1/2013 | Williams et al. | |
| 2013/0092271 A1 | 4/2013 | Downs et al. | |
| 2013/0099489 A1 | 4/2013 | Williams et al. | |
| 2013/0207380 A1 | 8/2013 | Williams et al. | |
| 2013/0245531 A1 | 9/2013 | Brandl et al. | |
| 2013/0289517 A1 | 10/2013 | Williams et al. | |
| 2013/0320668 A1 | 12/2013 | Cheon et al. | |

(56) References Cited

U.S. PATENT DOCUMENTS

| | | | |
|---|---|---|---|
| 2013/0333767 A1 | 12/2013 | Schmidt | |
| 2014/0060675 A1 | 3/2014 | Wilhelm et al. | |
| 2014/0117664 A1 | 5/2014 | Ekstrom | |
| 2014/0230608 A1* | 8/2014 | Junkers | F16L 39/00 285/123.1 |
| 2014/0260554 A1 | 9/2014 | Rankin | |
| 2014/0261819 A1 | 9/2014 | Vranish | |
| 2015/0028586 A1 | 1/2015 | Gerst et al. | |
| 2015/0061282 A1* | 3/2015 | Faldt | F16L 39/00 285/124.5 |
| 2015/0076815 A1 | 3/2015 | Lombardi, III et al. | |
| 2015/0090915 A1 | 4/2015 | Vranish | |
| 2015/0135502 A1 | 5/2015 | Rankin et al. | |
| 2015/0231369 A1 | 8/2015 | Gray et al. | |
| 2015/0260325 A1 | 9/2015 | Quick | |
| 2015/0276111 A1 | 10/2015 | Ira et al. | |
| 2016/0018037 A1 | 1/2016 | Nichols et al. | |
| 2016/0033068 A1 | 2/2016 | Wilhelm | |
| 2016/0046130 A1 | 2/2016 | Burdge et al. | |
| 2016/0047503 A1 | 2/2016 | Ballard et al. | |
| 2016/0102791 A1 | 4/2016 | Johnson et al. | |
| 2016/0208971 A1 | 7/2016 | Lewis et al. | |
| 2016/0208972 A1 | 7/2016 | Lewis et al. | |
| 2016/0243348 A1 | 8/2016 | Williams et al. | |
| 2016/0305574 A1 | 10/2016 | Burdge | |
| 2017/0009919 A1 | 1/2017 | Lewis et al. | |
| 2017/0020711 A1 | 1/2017 | Nishtala et al. | |
| 2017/0102105 A1* | 4/2017 | Truong | F16L 39/00 |
| 2017/0203089 A1 | 7/2017 | Ciccone et al. | |
| 2017/0205009 A1* | 7/2017 | Pappalardo | F16L 39/00 |
| 2018/0304066 A1 | 10/2018 | Ciccone et al. | |
| 2019/0078714 A1 | 3/2019 | Brugger et al. | |
| 2019/0138032 A1 | 5/2019 | Shevgoor | |
| 2019/0269901 A1 | 9/2019 | Ciccone et al. | |
| 2020/0188651 A1 | 6/2020 | Ciccone et al. | |
| 2021/0095802 A1 | 4/2021 | Andrews et al. | |
| 2022/0252194 A1 | 8/2022 | Benson | |
| 2022/0305249 A1 | 9/2022 | Nichols et al. | |
| 2023/0003324 A1 | 1/2023 | Ciccone et al. | |

FOREIGN PATENT DOCUMENTS

| | | | |
|---|---|---|---|
| CA | 2 844 802 | 2/2013 | |
| EP | 0711946 A1 * | 5/1996 | F16L 37/56 |
| FR | 2 960 425 | 12/2011 | |
| JP | 6214465 | 4/1987 | |
| JP | 2011-075055 | 4/2011 | |
| WO | 01/10362 | 2/2001 | |
| WO | 2014/178861 | 11/2014 | |
| WO | WO 2022/129413 A1 | 6/2022 | |

OTHER PUBLICATIONS

Youtube. CPC Aseptiquik G Assembly. Video, https://www.youtube.com/watch?v=XEFy0cQ6cJg, published in Year: 2017, originally downloaded Apr. 24, 2023.

Youtube. Kleenpak® Presto Sterile Connector (Pall Biotech). Video, https://www.youtube.com/watch?v=8LktNhZQras, published in Year: 2018, originally downloaded Apr. 24, 2023.

PCT International Patent Application No. PCT/US22/35669, International Search Report and Written Opinion of the International Searching Authority dated Oct. 20, 2022, 11 pages.

Eldon James. Introducing SeriesLock™ the Spring-Free Flow Path Quick Disconnect Coupler (with video). Website, https://www.eldonjames.com/serieslock-quick-disconnect-coupler/, originally downloaded Jun. 6, 2018, 5 pages.

Nordson Medical. Shop Fluid Management Products. Website, https://www.nordsonmedical.com, originally downloaded Jun. 29, 2020, 3 pages.

PCT International Patent Application No. PCT/US18/21467, International Search Report and Written Opinion of the International Searching Authority dated Jun. 1, 2018, 9 pages.

PCT International Patent Application No. PCT/US2017/014189, International Search Report and Written Opinion of the International Searching Authority, mailed May 23, 2017, 13 pages total.

European Patent Application No. 16000568.2, Office Action dated Apr. 1, 2019, 7 pages.

European Patent Application No. 17741950.4, Extended European Search Report dated Sep. 12, 2019, 8 pages.

U.S. Appl. No. 15/410,636, Office Action mailed Aug. 18, 2017.

U.S. Appl. No. 15/410,636, Office Action mailed Sep. 22, 2017.

U.S. Appl. No. 15/410,636, Office Action mailed Jan. 25, 2018.

U.S. Appl. No. 15/912,280, Office Action mailed Dec. 7, 2018.

U.S. Appl. No. 15/912,280, Office Action mailed Apr. 23, 2019.

U.S. Appl. No. 16/024,414, Office Action mailed Dec. 18, 2019.

U.S. Appl. No. 16/024,414, Office Action mailed Jul. 24, 2020.

U.S. Appl. No. 16/503,757, Office Action mailed Aug. 15, 2019.

European Patent Application No. 17741950.4, Office Action dated Jul. 30, 2020, 5 pages.

European Patent Application No. 18763491.0, Extended European Search Report dated Dec. 16, 2020, 13 pages.

Japanese Patent Application No. 2018/537509, Official Action mailed Apr. 2, 2020, 7 pages (with English translation).

U.S. Appl. No. 16/415,640, Office Action mailed Apr. 27, 2020.

U.S. Appl. No. 16/415,640, Office Action mailed Jan. 12, 2021.

U.S. Appl. No. 16/415,640, Office Action mailed Jul. 20, 2021.

U.S. Appl. No. 16/024,414, Office Action mailed Feb. 2, 2021.

U.S. Appl. No. 16/024,414, Office Action mailed Aug. 31, 2021.

U.S. Appl. No. 16/811,223, Office Action mailed Jul. 22, 2021.

U.S. Appl. No. 16/802,412, Office Action mailed Oct. 27, 2020.

PCT International Patent Application No. PCT/US24/26237, International Search Report and Written Opinion of the International Searching Authority mailed Aug. 14, 2024, 10 pages.

Corresponding Canadian Patent Application No. 3,156,502, Office Action mailed Sep. 11, 2024, 4 pages.

* cited by examiner

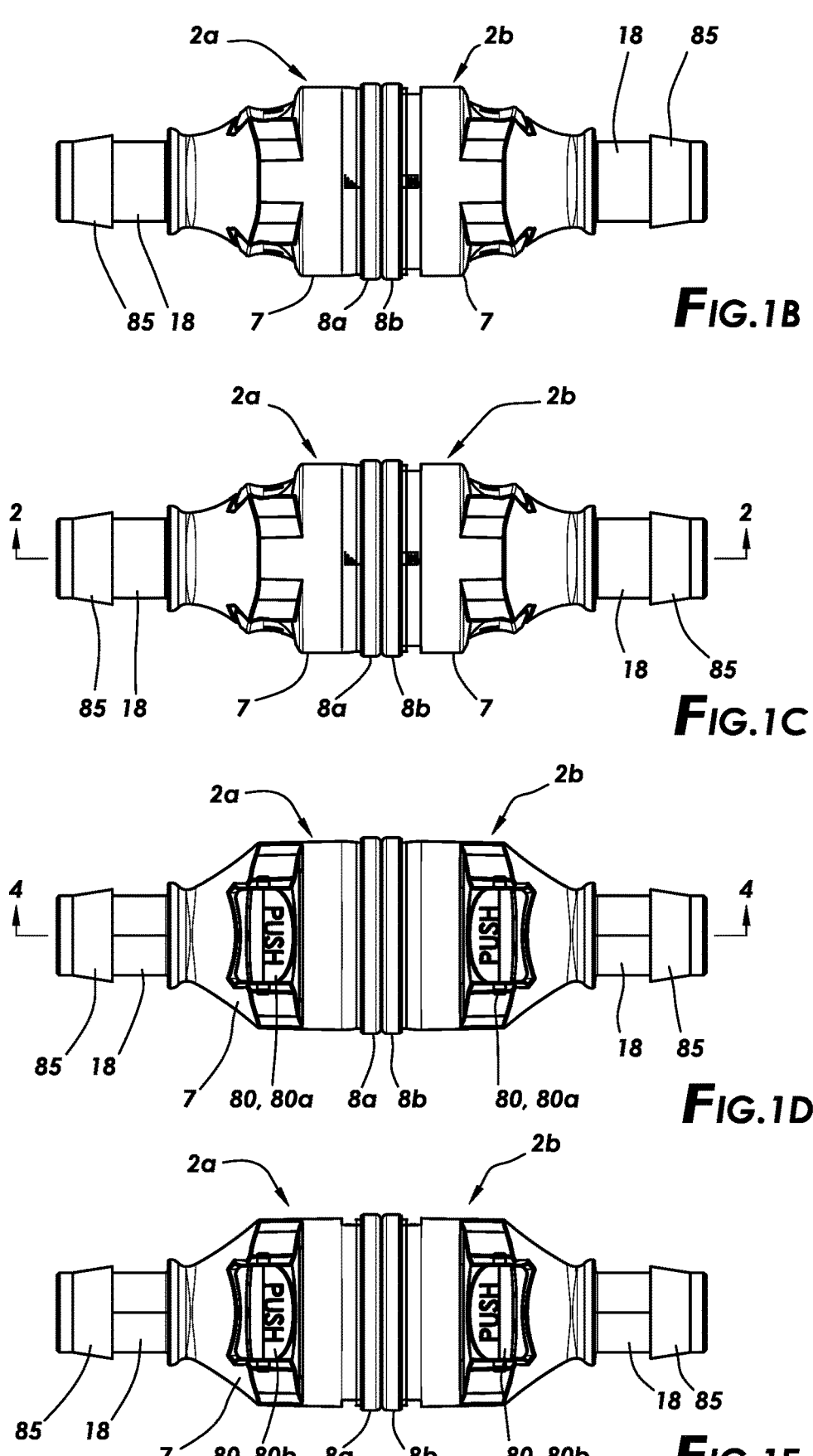
*F*IG.1B
*F*IG.1C
*F*IG.1D
*F*IG.1E

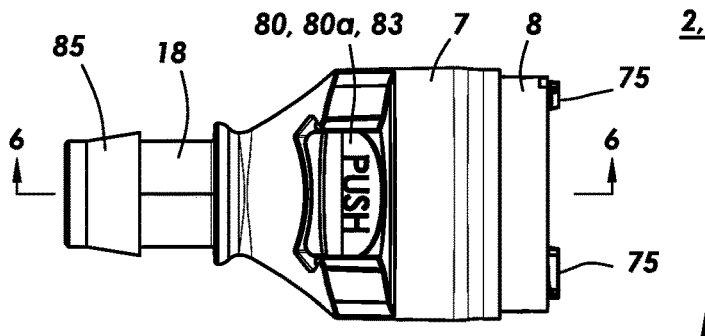
*F*IG.5B
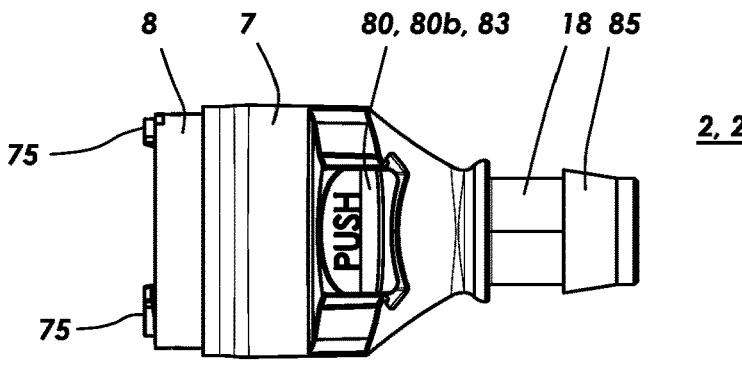
*F*IG.5C
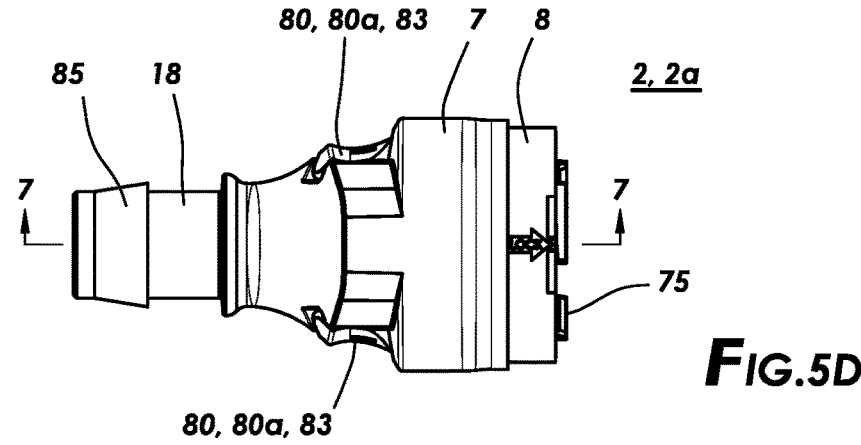
*F*IG.5D
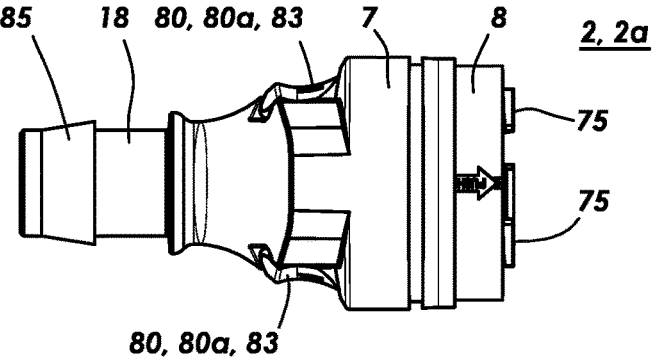
*F*IG.5E

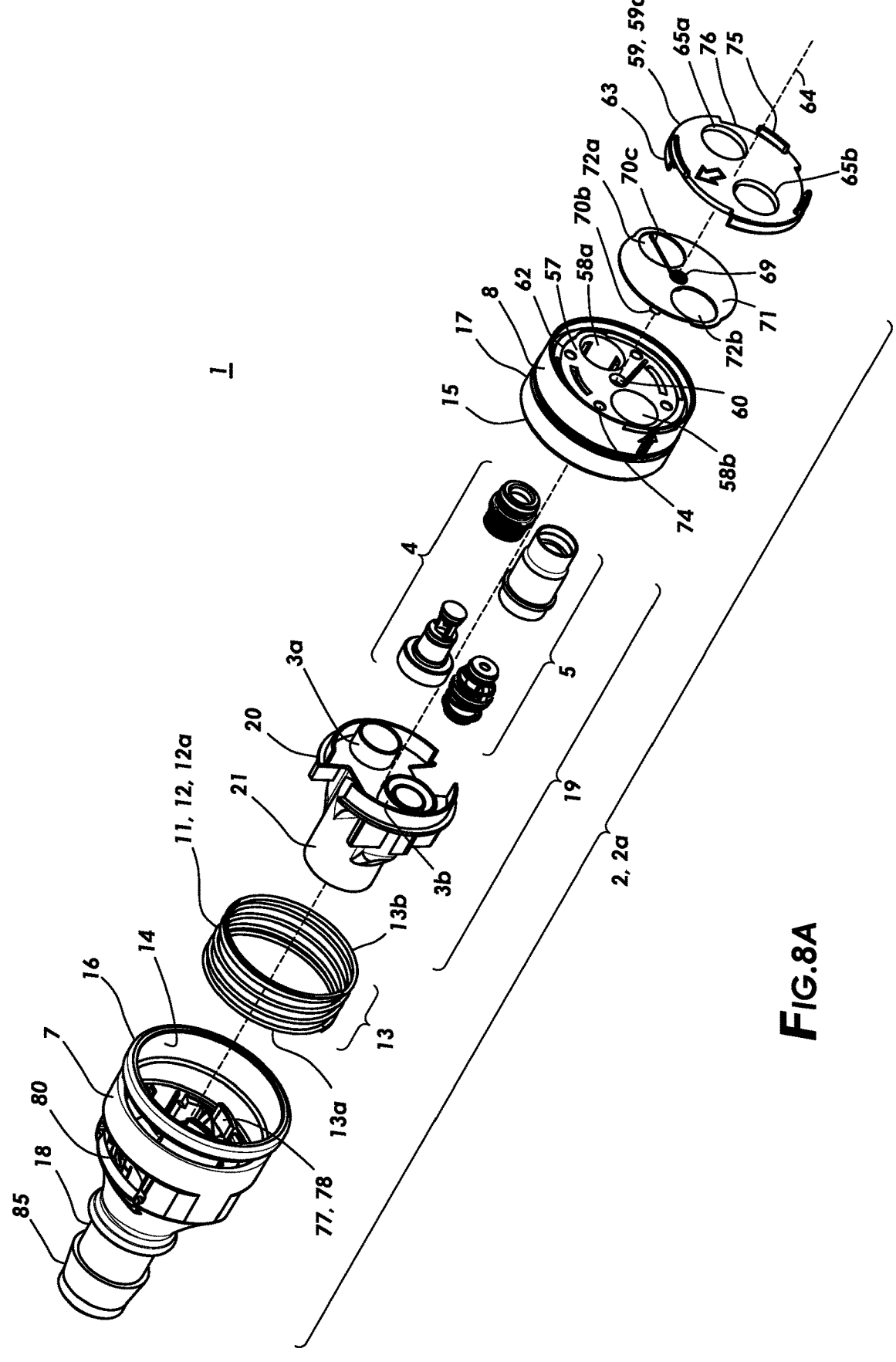
_FIG.8A_

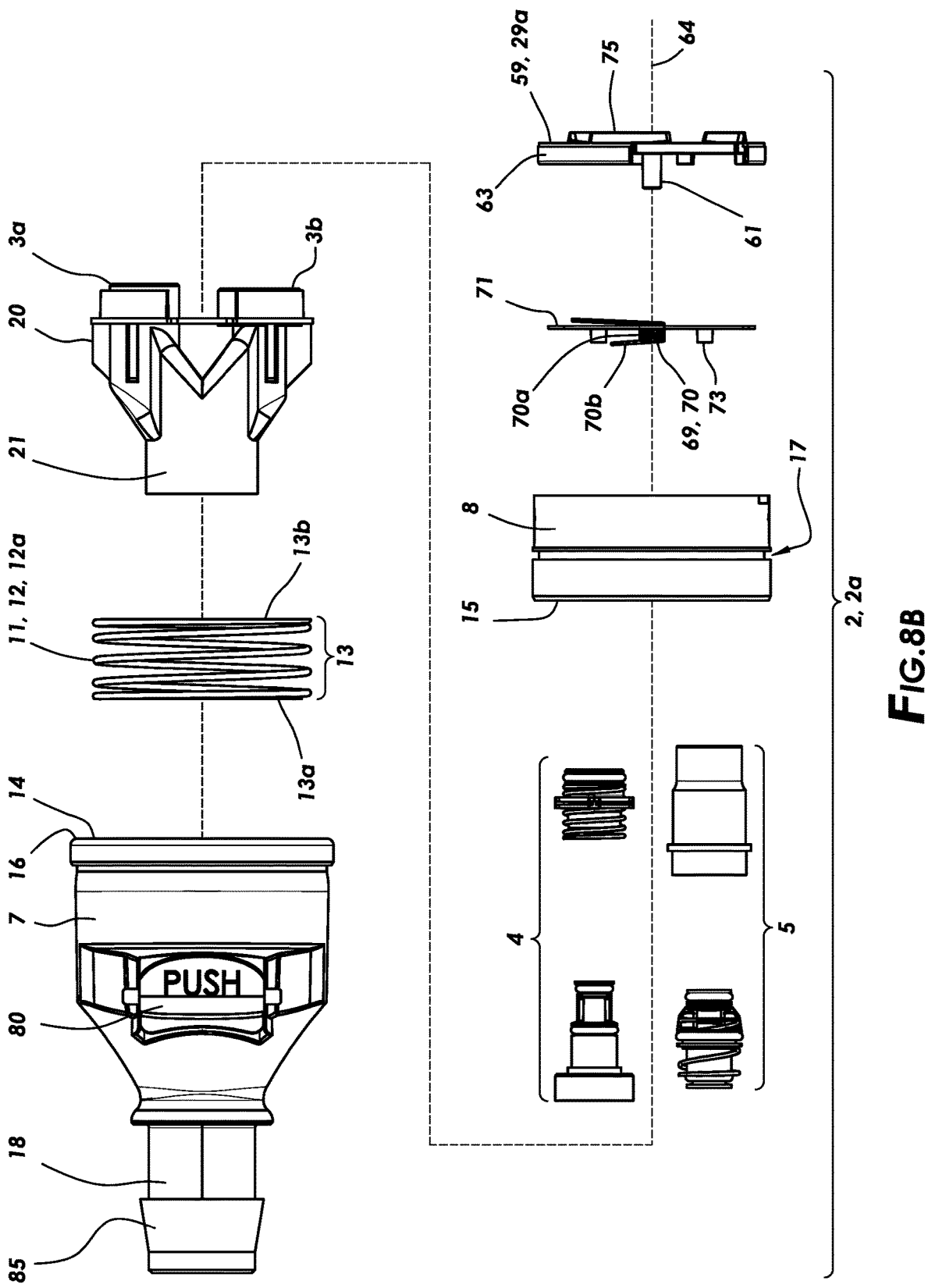
*F*IG.8B

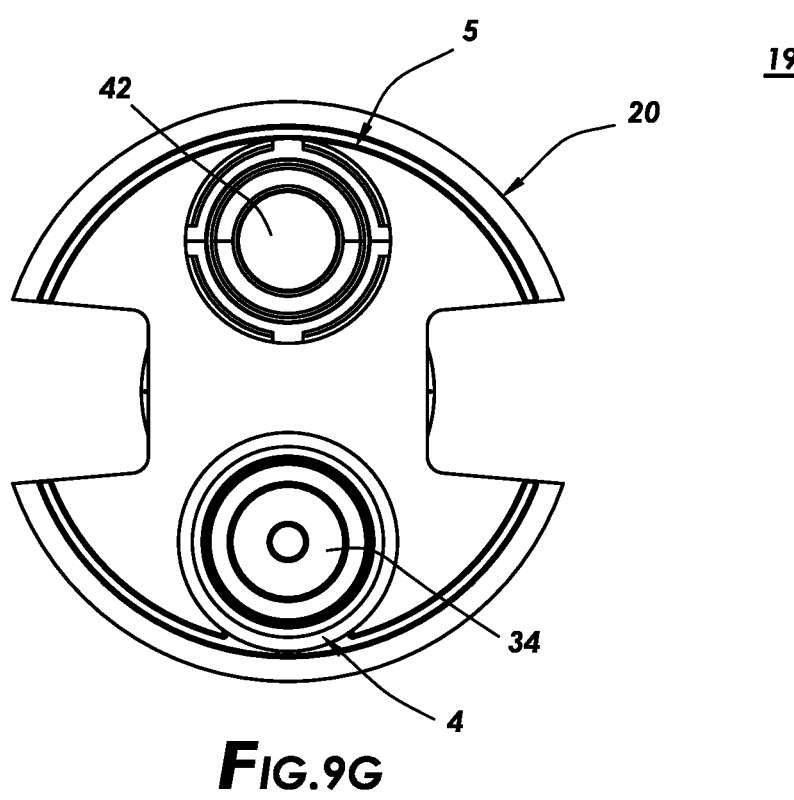
*F*IG.9G
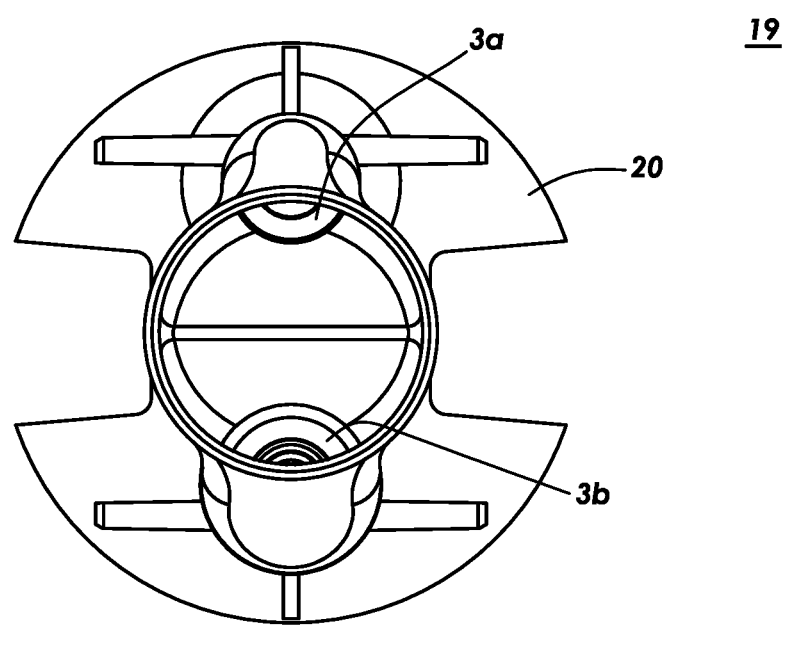
*F*IG.9F

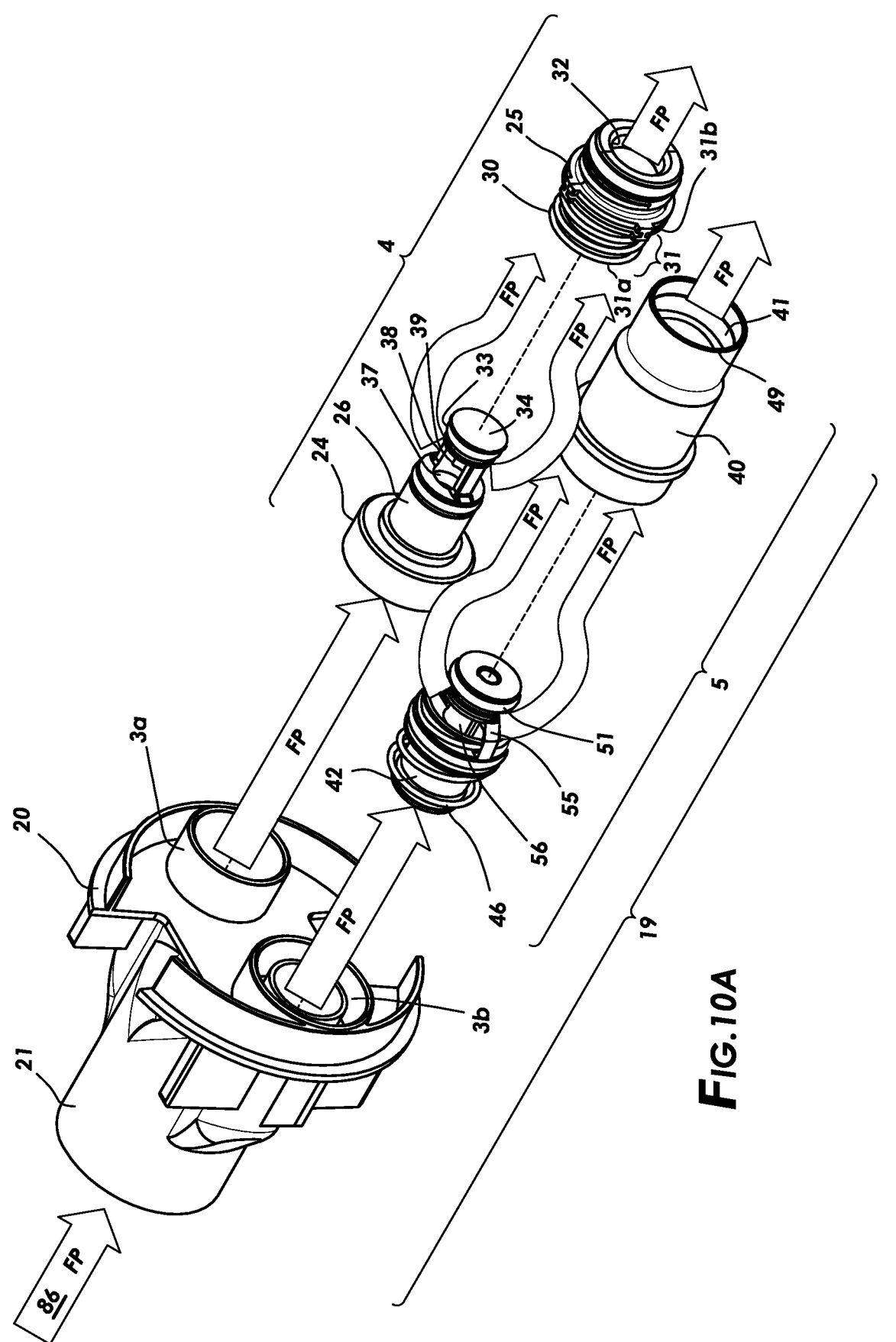
*F*IG.10A

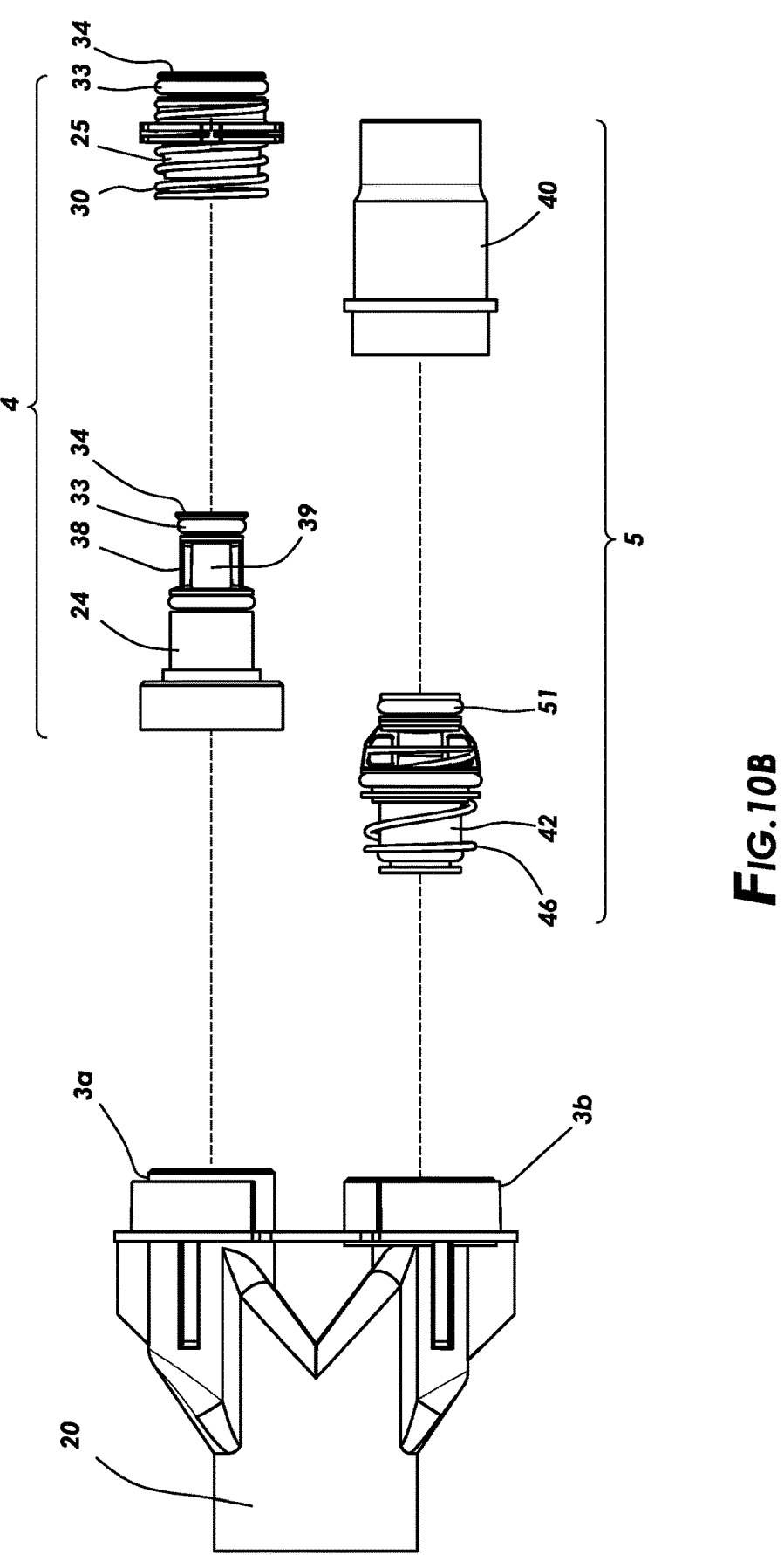
*F*IG.*10B*

GENDERLESS ASEPTIC CONNECTOR

I. FIELD OF THE INVENTION

A connector system including a plurality of connectors having substantially identical structure each defining a pair of fluid conduits wherein a first one of the pair of fluid conduits terminating in a male fitting and a second one of said pair fluid conduits terminating in a female fitting, wherein the male fittings and the female fittings of a pair of connectors mate in a fluid transmission connection.

II. BACKGROUND OF THE INVENTION

In the electrical, mechanical, and medical trades and manufacturing, each half of a pair of mating connectors or fasteners is conventionally assigned the designation male or female. The structure of the male connector is different than the structure of the female connector. The female connector is generally a receptacle that receives and holds the male connector. There would be substantial advantages in a genderless connector system including a plurality of connectors each having substantially identical structure which can be releasably mated to provide a fluid connection. A genderless connector can reduce the expense of labor and materials in the production process, in the supply chain, and for the consumer by the elimination of the conventional structure of mated pairs of connectors in which a first connector has only a female configuration and a second connector has only a male configuration by replacement with a single configuration of genderless connector including both male and female fittings. In the production process of the instant inventive genderless connector only one set of production molds can yield all the parts for a single assembly process to produce the inventive genderless connector which does not require separate part identification, binning, packaging or inventory control, as required of conventional connectors which employ a discrete configuration of male connector and a discrete configuration of female connector, and which can releasably mate to provide a fluid connection.

III. SUMMARY OF THE INVENTION

Accordingly, a broad object of particular embodiments of the invention can be to provide a connector having a first connector housing including a valve assembly defining a pair of fluid conduits, one of the pair of fluid conduits terminating in a male fitting and one of the pair fluid conduits terminating in a female fitting, the male fitting and said female fitting of a pair of connectors configured to mate in a fluid transmission connection.

Another broad object of particular embodiments of the invention can be to provide a connector structured to reduce or obviate contamination of the matable male and female fittings, and without limitation to the breadth of the foregoing, examples of contamination include inorganic particles and organic particles; bodily tissues, fluids, or excrements; liquids fluids; microorganisms such as bacteria, arechaea, fungi, protozoa, and viruses. Particular embodiments of the inventive connector can include a first connector housing and a second connector housing having biased telescoping engagement to the first connector housing between an extended condition and a retracted condition, wherein the second connector housing has a pair of apertures aligned with the male fitting and the female fitting and a locking disk rotatably coupled to the second connector housing, and wherein the locking disk has a pair of apertures which can be disposed between a nonaligned condition covering the pair of apertures in said second connector housing with the locking disk and an aligned condition aligning the pair of apertures in the locking disk with the pair of apertures in said second connector housing allowing the male fitting and the female fitting to correspondingly pass through the pair of apertures in the second connector housing and the pair of apertures in the locking disk disposed in the aligned condition and with the second housing in the retracted condition.

Another broad object of particular embodiments of the invention can be to provide a pair of connectors wherein each of the first connector and second connector of the pair of connectors includes a first connector housing including a pair of fluid conduits, one of the pair of fluid conduits terminating in a male fitting and one of said pair fluid conduits terminating in a female fitting and a second connector housing having telescoping engagement to the first connector housing between an extended condition and a retracted condition, wherein the second connector housing has a pair of apertures aligned with the male fitting and said female fitting and a locking disk rotatably coupled to the second connector housing and having a pair of apertures alignable with the pair of apertures in the second connector housing, wherein the locking disk of a first connector rotatably interlocks with the locking disk of a second connector to align the pair of apertures of each locking disk with the pair of apertures in the second connector housing to allow the male fittings and female fittings of the first connector and the second connector to pass through the respective pairs of apertures of the locking disk of the first connector and the locking disk of the second connector to mate in a fluid transmission connection.

Naturally, further objects of the invention are disclosed throughout other areas of the specification, drawings, photographs, and claims.

IV. BRIEF DESCRIPTION OF THE DRAWINGS

FIG. 1B is a first side view of the particular embodiment of the connector system shown in FIG. 1A.

FIG. 1C is a second side view of the particular embodiment of the connector system shown in FIG. 1A.

FIG. 1D is a top view of the particular embodiment of the connector system shown in FIG. 1A.

FIG. 1E is a bottom view of the particular embodiment of the connector system shown in FIG. 1A.

FIG. 5B is a top view of the particular embodiment of the connector shown in FIG. 5A.

FIG. 5C is a bottom view of the particular embodiment of the connector shown in FIG. 5A.

FIG. 5D is a first side view of the particular embodiment of the connector shown in FIG. 5A.

FIG. 5E is a second side view of the particular embodiment of the connector shown in FIG. 5A.

FIG. 8A is an isometric exploded view of a particular embodiment of the connector shown in FIG. 5A.

FIG. 8B is a side exploded view of the particular embodiment of the connector shown in FIG. 5A.

FIG. 9F is a first end view of the particular embodiment of the valve assembly.

FIG. 9G is a second end view of the particular embodiment of the valve assembly.

FIG. 10A is an isometric exploded view of the valve assembly shown in FIG. 9A.

FIG. 10B is first side exploded view of the particular embodiment of the valve assembly.

V. DETAILED DESCRIPTION OF THE INVENTION

Figure 1A:
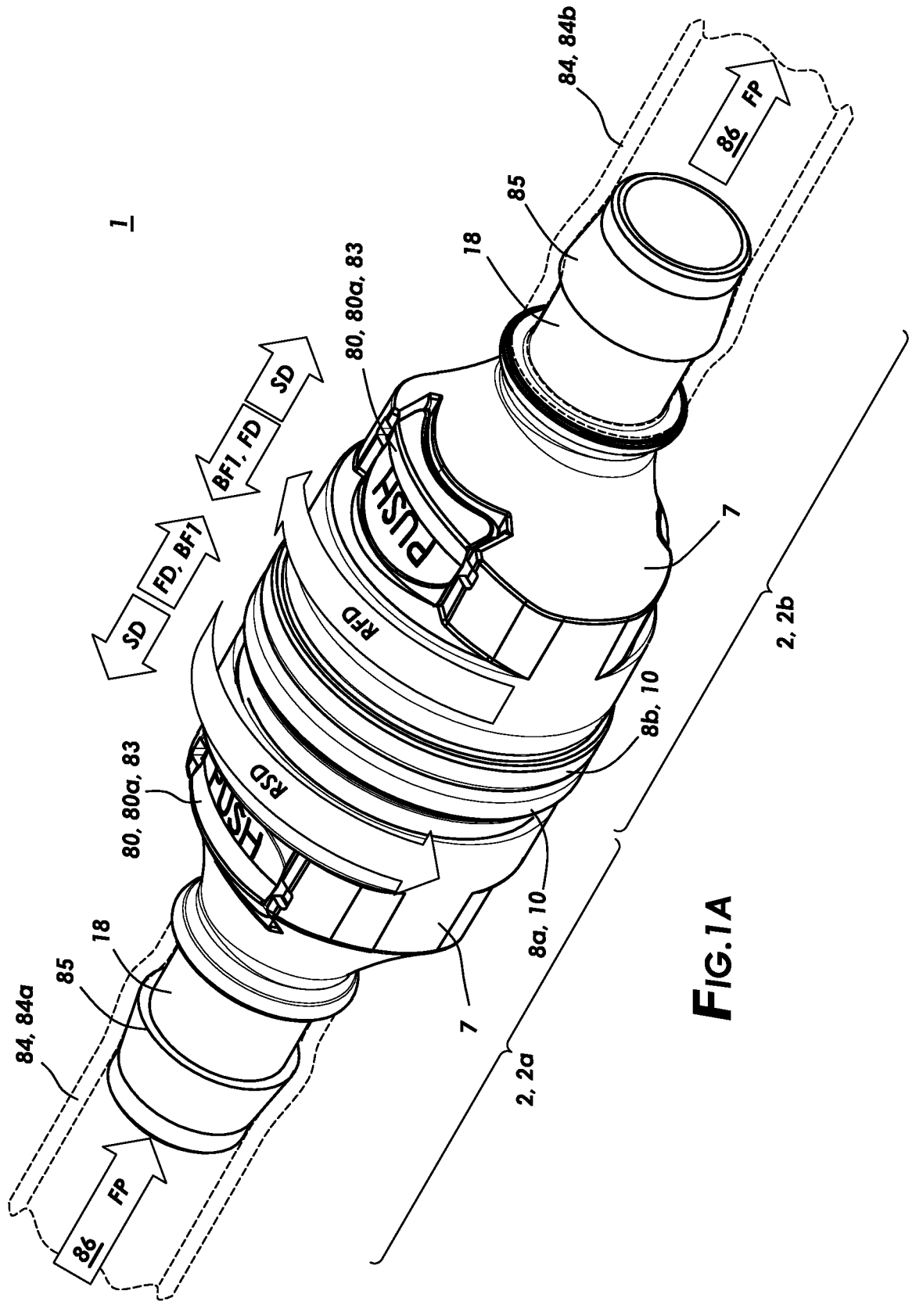
FIG. 1A is an isometric view of a particular embodiment of a connector system in which a first connector releasably mates with second connector to provide a fluid transmission connection.

With general reference to FIGS. 1A through 1G, FIGS. 2 through 4, 5A through 5G, 6 thorough 7, 8A through 8B, 9A through 9G, and 10A through 10B, a connector system (1) can include a plurality of connectors (2) of substantially identical structure each defining a pair of fluid conduits (3a, 3b), a first one of said pair of fluid conduits (3a) terminating in a male fitting (4) and a second one of said pair fluid conduits (3b) terminating in a female fitting (5), wherein the male fittings (4) and the female fittings (5) of a pair of connectors (2a, 2b) configured to mate in a fluid transmission connection (6).

Figure 5A:
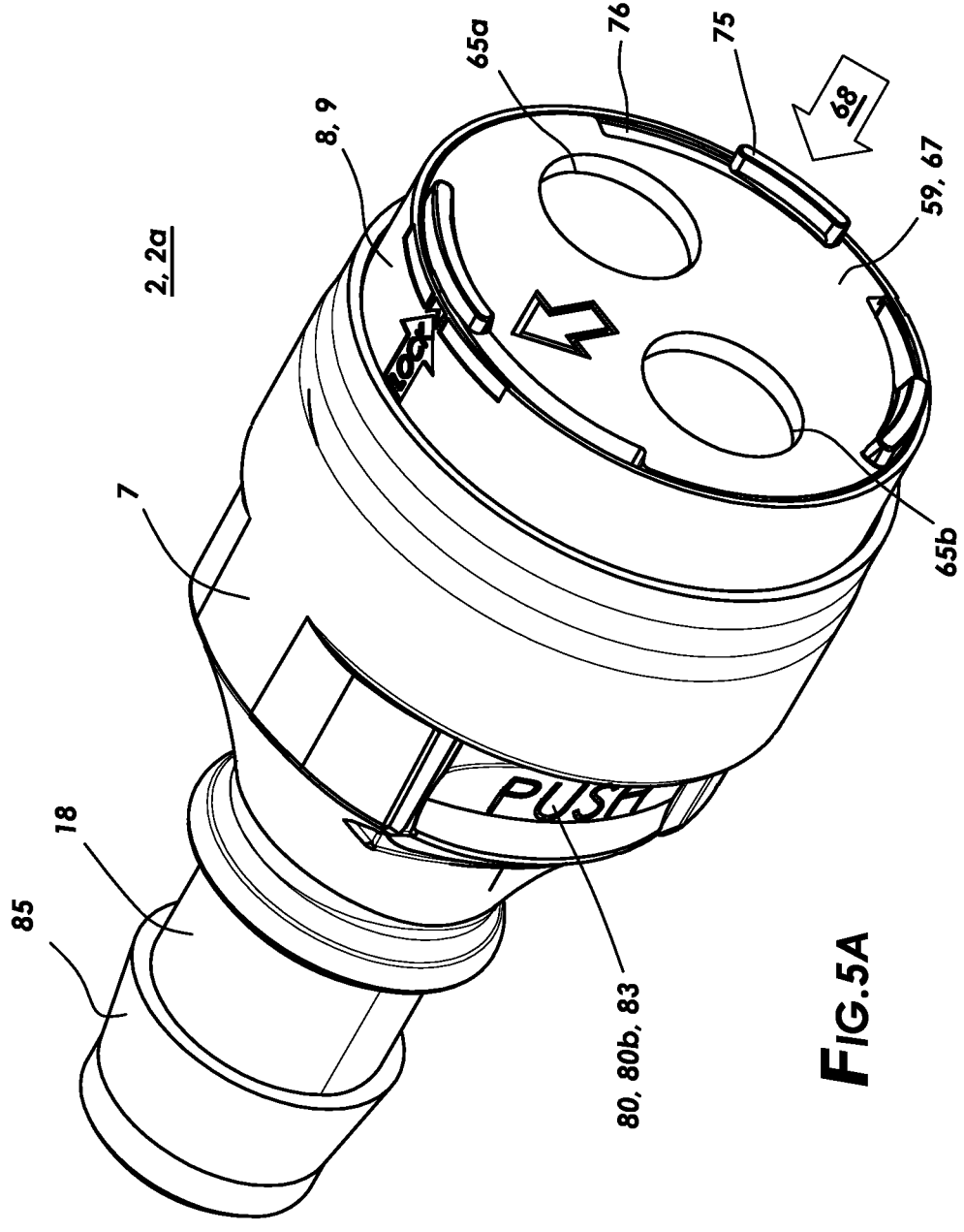
FIG. 5A is an isometric view of a particular embodiment of a connector of the connector system shown in FIGS. 1A-1G.
Figures 5F, 5G, 6:
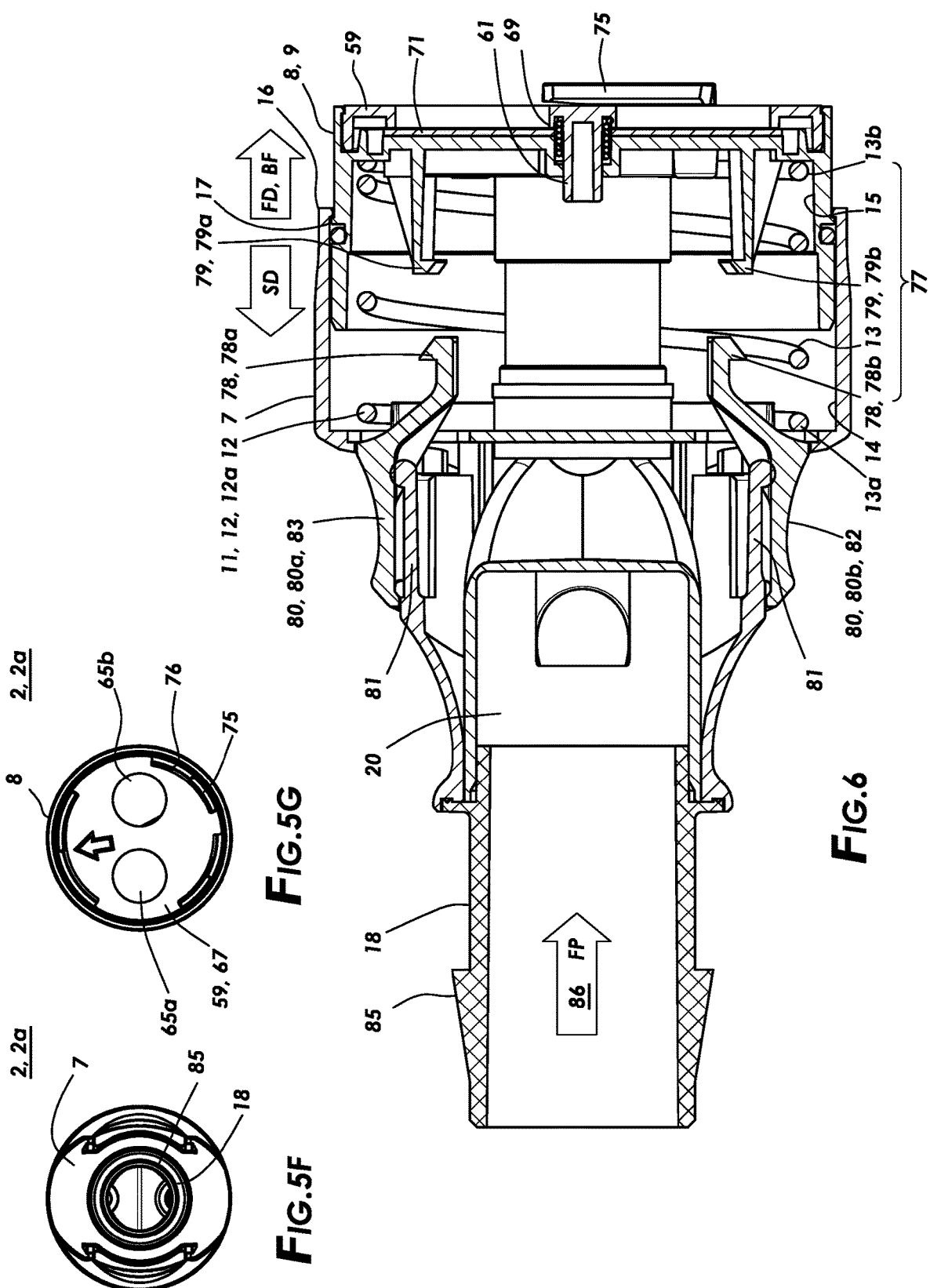
FIG. 5F is a first end view of the particular embodiment of the connector shown in FIG. 5A.
FIG. 5G is a second end view of the particular embodiment of the connector shown in FIG. 5A.
FIG. 6 is a cross-sectional view 6-6 of the particular embodiment of the connector shown in FIG. 5B.
Figure 7:
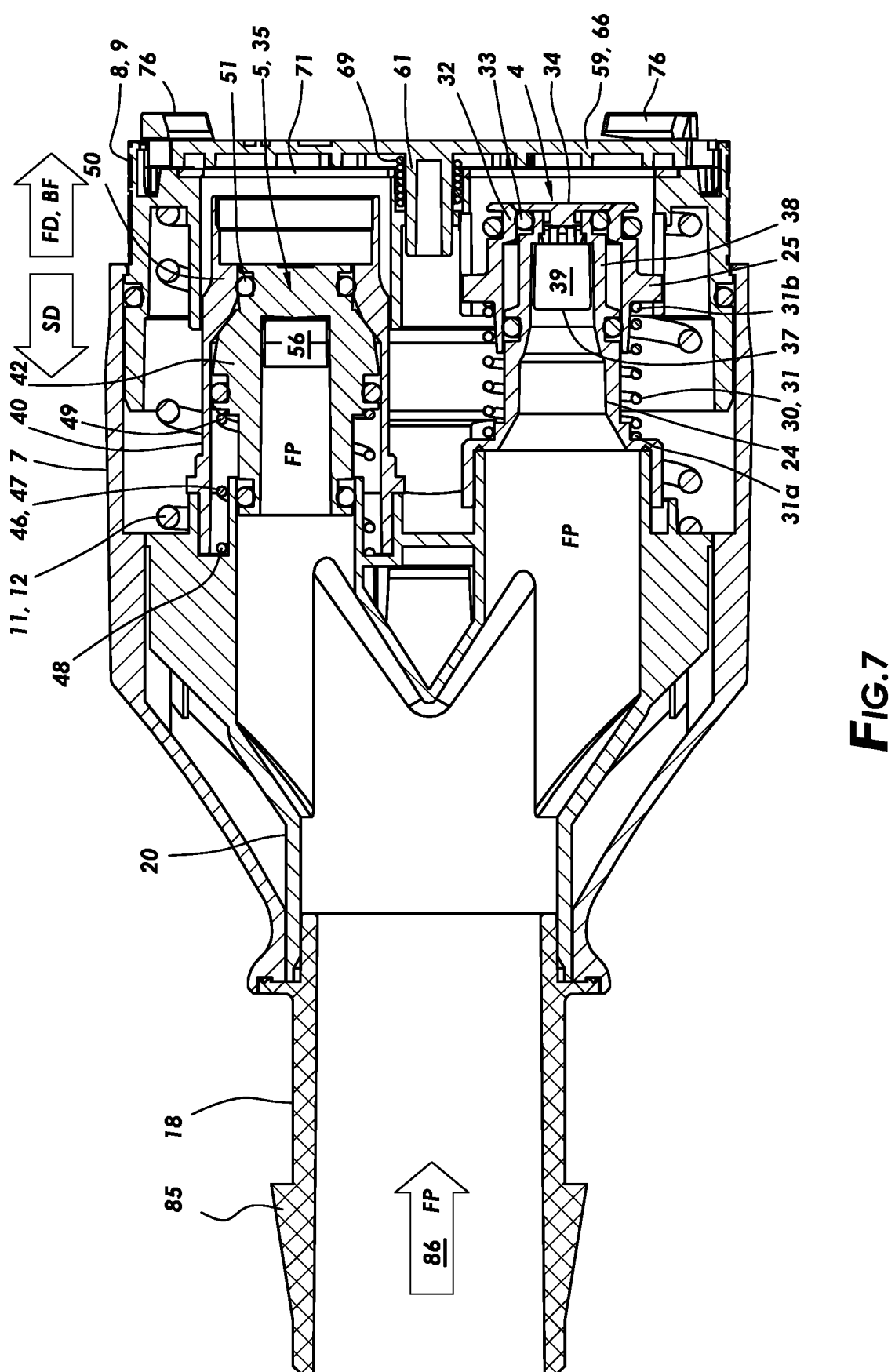
FIG. 7 is a cross-sectional view 7-7 of the particular embodiment of the coupler shown in FIG. 5D.

Now, with primary reference to FIGS. 5A through 5G and FIGS. 6 and 7 and 8A and 8B each of a plurality of connectors (2) can include a first connector housing (7) and a second connector housing (8) having telescoping engagement or biased telescoping engagement to the first connector housing (7) to afford movement between an second connector housing extended condition (9) (as shown in the illustrative example of FIG. 5A) and a second connector housing retracted condition (10) (as shown in the illustrative example of FIG. 1A). The term "biased" for the purposes of the instant invention means that a biasing member (11) generates a biasing force (BF) that acts on a component, part or element to favor movement of that component, part or element in a first direction (FD) as compared to a second direction (SD). As shown in cross section FIGS. 6 and 7, the second connector housing (8) can be biased toward the second connector housing extended condition (9) by action of a second connector housing biasing member (12) a compression spring (12a) having a spring helix (13) disposed adjacent a first and second connector housing internal surfaces (14, 15) and having a compression spring first end (13a) engaging the first connector housing (7) and a compression spring second end (13b) engaging the second connector housing (8). While the embodiment of the second connector housing biasing member (12) shown in the illustrative example of the Figures comprises a compression spring (12a), this is not intended to preclude other embodiments of a biasing member (12) adapted to or configured to generate biasing force (BF) to urge the second connector housing (8) toward the second connector housing extended condition (9). In particular embodiments, the first connector housing (7) can include a circumferential inwardly extending shoulder (16) and the second connector housing (8) can include a circumferential raised member (17) which engage in the second connector housing extended condition (9) of the second connector housing (8) to retain telescoping engagement of the first connector housing (7) to the second connector housing (8). The first connector housing (7) can further include a fluid inlet conduit (18) defining a fluid path (FP) into the first connector housing (7). The fluid inlet conduit (18) can be integrated with the first connector housing (7) as one part, or as shown in the example of FIGS. 6 and 7, can be a discrete part assembled to the first connector housing (7).

Figure 9A:
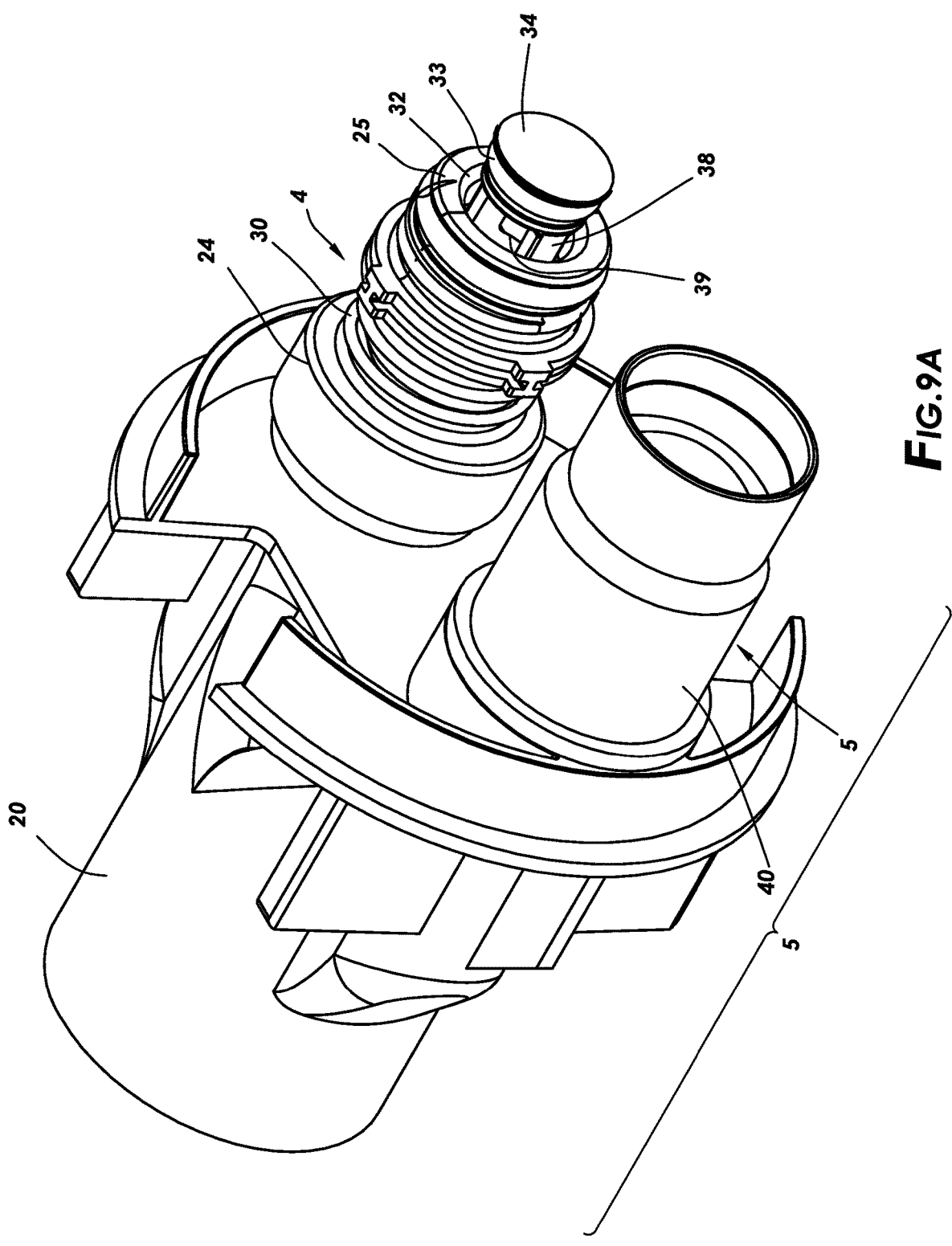
FIG. 9A is an isometric view of a particular embodiment of a valve assembly of the connector shown in FIG. 8A including a pair of fluid conduits, one of the pair of fluid conduits terminating in a male fitting and one of the pair fluid conduits terminating in a female fitting.
Figures 9B, 9C:
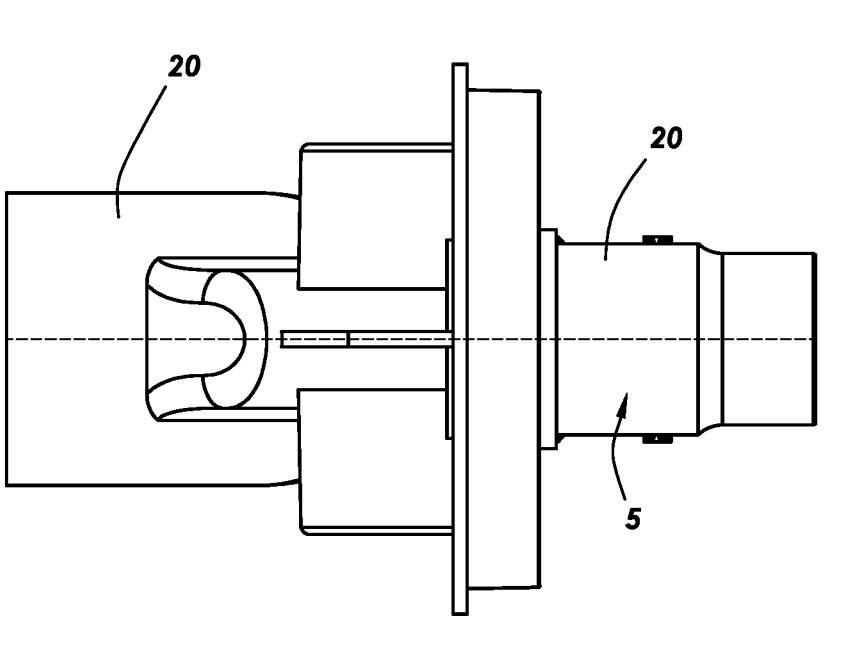
FIG. 9B is a first side view of the particular embodiment of the valve assembly shown in FIG. 9A.
FIG. 9C is a second side view of the particular embodiment of the valve assembly.
Figure 9D:
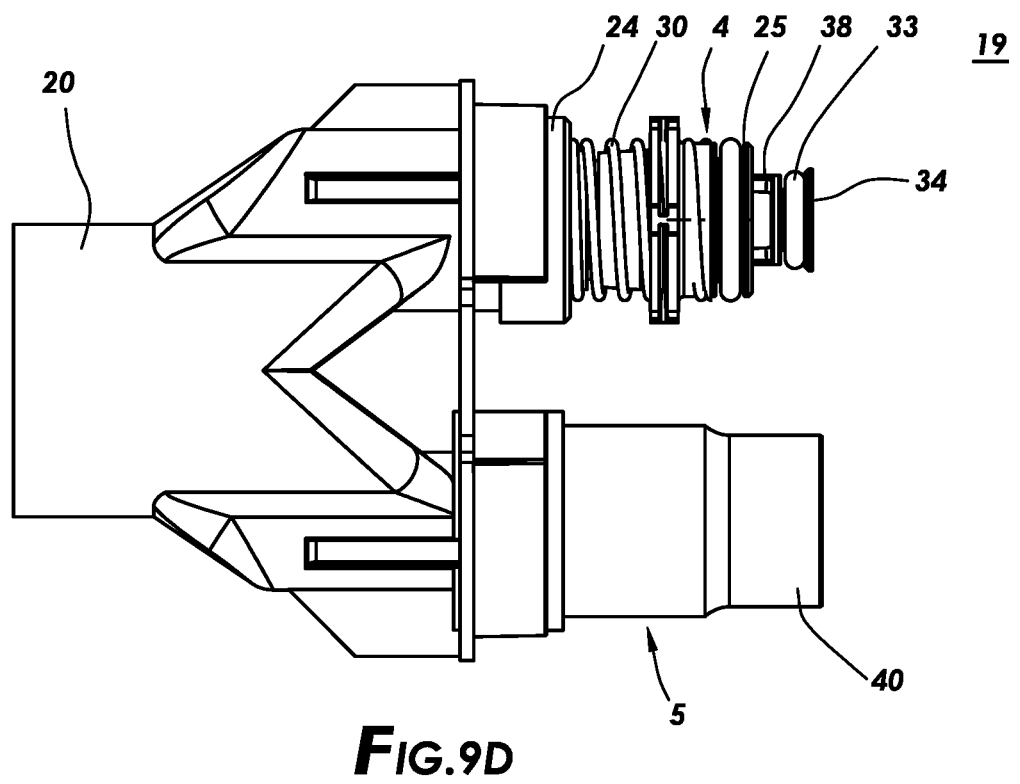
FIG. 9D is top view of a particular embodiment of a valve assembly of the valve assembly.
Figure 9E:
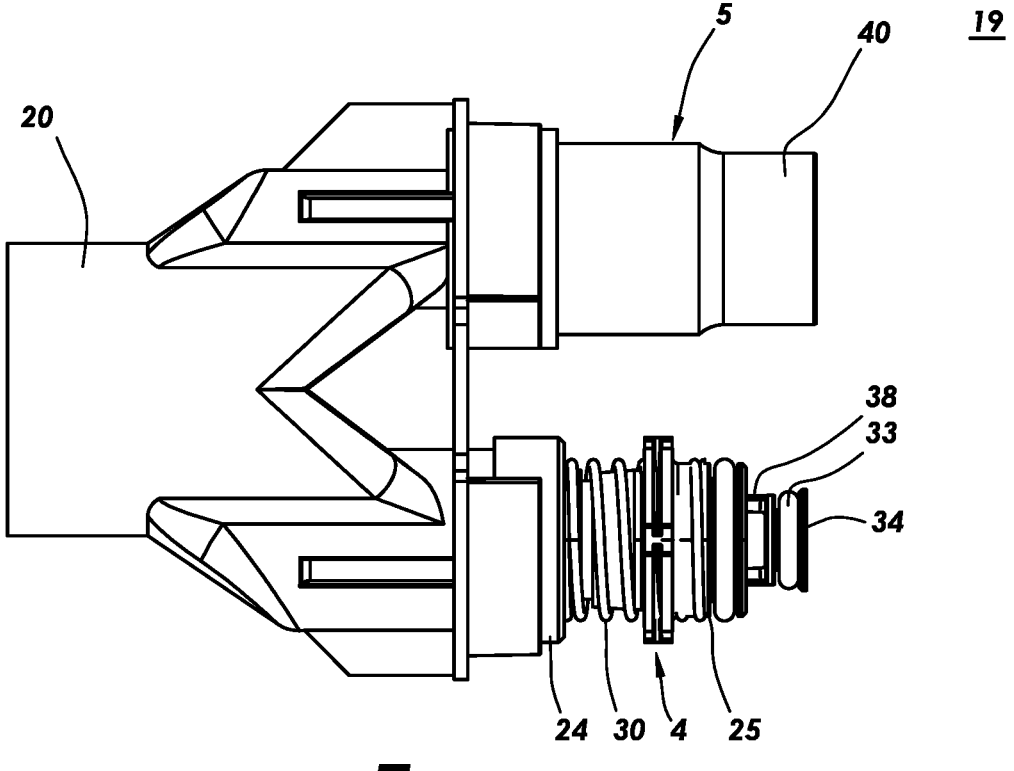
FIG. 9E is a bottom view of the particular embodiment of the valve assembly.

Now, with primary reference to FIGS. 9A through 9G, each of a plurality of connectors (2) can further include a valve assembly (19) disposed inside of the telescopingly engaged first and second connector housings (7, 8) (as shown in the examples of FIGS. 6, 7, and 8A through 8B). The valve assembly (19) can include a bifurcate body (20) having valve assembly fluid inlet (21) fluidically coupled to the fluid inlet conduit (18) (as shown in example cross sections of FIGS. 6 and 7). The bifurcate body (20) branches into a pair fluid conduits (3a, 3b) (as shown in FIGS. 9B and 9C). The first one of the pair of fluid conduits (31) terminates in a male fitting (4) and a second one of the pair fluid conduits (3b) terminates in a female fitting (5) (as shown the example of FIG. 9A).

Figures 1F, 1G, 2:
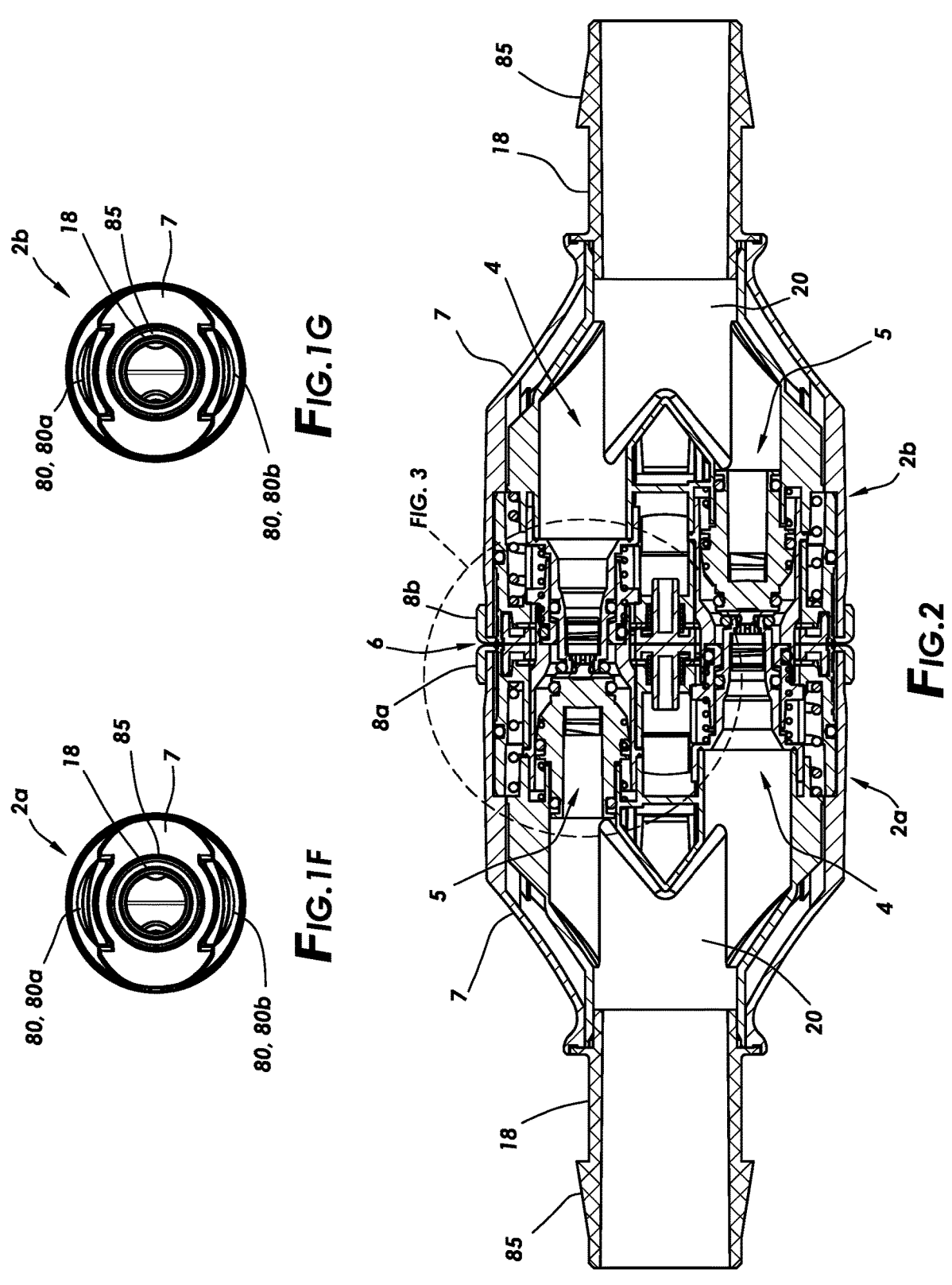
FIG. 1F is a first end view of the particular embodiment of the connector system shown in FIG. 1A.
FIG. 1G is a second end view of the particular embodiment of the connector system shown in FIG. 1A.
FIG. 2 is a cross-sectional view 2-2 of the particular embodiment of the connector system shown in FIG. 1C.
Figure 3:
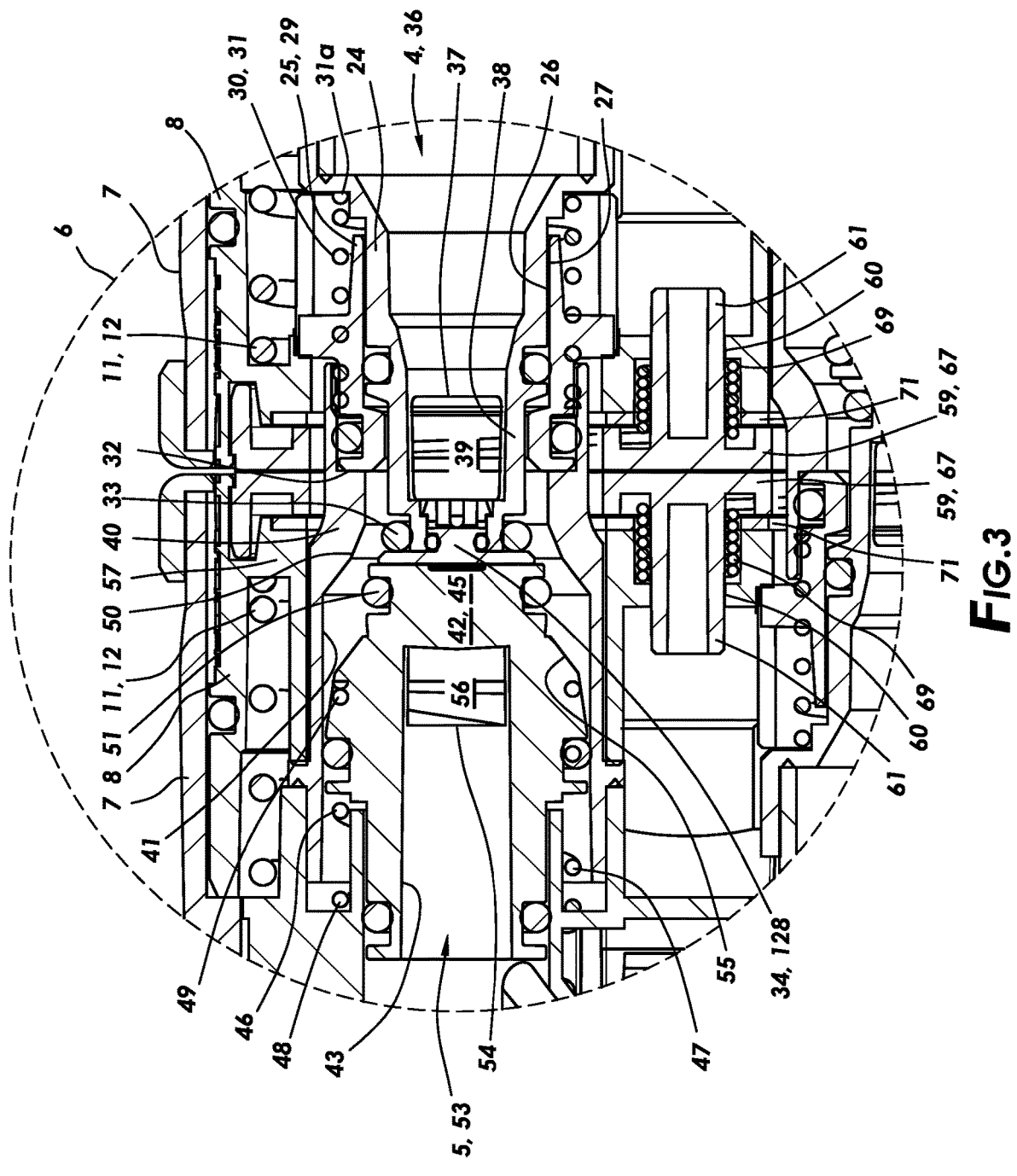
FIG. 3 is an enlarged view of a portion of the cross-sectional view 2-2 of the connector system shown in FIG. 2.

Now, with primary reference to FIGS. 2, 3, 7, 9A through 9G and 10A through 10B, which provides isometric, cross section, and exploded views of the male fitting (4) and the female fitting (5), each of which respectively operate to afford a closed condition (22) of the respective first one and second one of the pair of fluid conduits (3a, 3b) (as shown in the example of FIG. 7) and further operate as a mated pair to afford an open condition (23) of the respective first one and second one of the pair of fluid conduits (3a, 3b) (as shown in the example of FIGS. 2 and 3).

As shown in the FIGS. 3 and 7 and FIGS. 8A through 8B and 10A through 10B, the male fitting (4) can include a male fitting first tubular body (24) and a male fitting second tubular body (25) defining the flow path (FP) of the first one of the pair of fluid conduits (3a). The male fitting second tubular body internal surface (27) can have biased telescoping engagement with the male fitting first tubular body external surface (26) between a second tubular body extended condition (28) (as shown in the illustrative example of FIG. 7) and a second tubular body retracted condition (29) (as shown in the illustrative example of FIGS. 2 and 3). As shown in cross section FIG. 7 and exploded view FIG. 10, the male fitting second tubular body (25) can be biased toward the second tubular body extended condition (28) by action of a coil spring (30) having the coil spring helix (31) disposed adjacent the first tubular body external surface (26) and a coil spring first end (31a) engaging the male fitting first tubular body (24) and a coil spring second end (31b) engaging the male fitting second tubular body (25). Embodiments of the male fitting first tubular body (24) may be integral with the bifurcate body (20) or may be a discrete part assembled to the bifurcate body (20) as shown in the example of FIGS. 10A and 10B.

As shown in FIGS. 7 and 10A, the male fitting second tubular body internal surface (27) can be configured to include a male fitting valve seat (32) which sealably engages a male fitting valve seal (33) coupled to a male fitting valve body (34) engaged to the male fitting first tubular body (25). The male fitting valve seal (33) engages the male fitting valve seat (32) in the second tubular body extended condition (28) to afford the male fitting closed condition (35) of the first one of the pair of fluid conduits (24) (as shown in the examples of FIGS. 7 and 9). In particular embodiments, the male fitting valve seal (33) can be disposed a distance from the first tubular member end opening (37) by one or more support members (38) outwardly extending from the male fitting first tubular member (24) in radially spaced apart relation about the male fitting first tubular member end opening (37) (as shown in the example of FIG. 10A). The open area (39) between the male fitting first tubular member opening (37) and the male fitting valve seal (33) affords a continuation of the flow path (FP) in the first one of the pair of fluid conduits (3a) to the male fitting second tubular member (25) (as shown by the flow arrows in FIG. 10A). Telescoping movement of the male fitting second tubular body (25) toward the second tubular body retracted condition (29) can disengage the male fitting valve seal (33) from the male fitting valve seat (32) to afford the male fitting open condition (36) of the first one of the pair of fluid conduits (3a) (as shown in the example of FIGS. 2, 3 and 10A).

Again, with primary reference to FIGS. 2, 3, 7, 9, and 10A, the female fitting (5) can include a female fitting tubular body (40) having a female fitting tubular body internal surface (41). A female fitting valve body (42) can be disposed in biased telescoping engagement inside of the female fitting tubular body (40). The female fitting valve body (42) can have a female fitting valve body internal surface (43) which combination with the female fitting tubular body internal surface (41) defines the flow path (FP) of the second one of the pair of fluid conduits (3b). The female fitting valve body (42) can move between a female fitting valve body extended condition (44) (as shown in the example of FIGS. 7 and 9) and a female fitting valve body retracted condition (45) (as shown in the example of FIGS. 2 and 3). As shown in cross section FIG. 7 and exploded view FIG. 10A, the female fitting valve body (42) can be biased toward the female fitting valve body extended condition (43) by action of a helical spring (46) having a helical spring helix (47) disposed about the female fitting valve body (42) and a helical spring first end (48) engaging the female fitting tubular body (40) and a helical spring second end (49) engaging the female fitting valve body (42). Embodiments of the female fitting tubular body (40) may be integral with the bifurcate body (20) or may be a discrete part assembled to the bifurcate body (20) as shown in the example of FIGS. 10A and 10B.

The female fitting tubular body internal surface (41) can be configured to include a female fitting valve seat (50) and the female fitting valve body (42) can be configured to include a female fitting valve seal (51). The female fitting valve seal (51) engages the female fitting valve seat (50) in the female fitting valve body extended condition (44) to afford a female fitting closed condition (52) of the second one of the pair of fluid conduits (3b) (as shown in the examples of FIGS. 7 and 9). Telescoping movement of the female fitting valve body (42) toward female fitting valve body retracted condition (45) can disengage the female fitting valve seal (51) from the female fitting valve seat (50) to afford the female fitting open condition (53) of the second one of the pair of fluid conduits (3b) (as shown in the example of FIGS. 2 and 3).

In particular embodiments, the female fitting valve seal (51) can be disposed a distance from a female fitting valve body end opening (54) by one or more female valve support members (55) outwardly extending from the female fitting valve body (42) in radially spaced apart relation about the female fitting valve body end opening (54) (as shown in the example of FIG. 10A). The open area (56) between the female fitting valve body end opening (54) and the female fitting valve seal (51) affords a continuation of the flow path (FP) in the second one of the pair of fluid conduits (3b) to the female fitting tubular body (40) (as shown by the flow arrows in FIG. 10A).

Now, with primary reference to FIG. 8A, the second connector housing (8) can include an end plate (57) having a pair of end plate apertures (58a, 58b) aligned with the male fitting (4) and the female fitting (5). The pair of end plate apertures (58a, 58b) can be configured to correspondingly allow the male fitting (4) and the female fitting (5) to pass through the end plate (57) in the second connector housing retracted condition (10) of the second connector housing (8).

Now, with primary reference to FIGS. 5A through 5G, 6, 7, and 8A and 8B, embodiments can include a locking disk (59) rotatably coupled adjacent the end piece (57) of the second connector housing (8). In particular embodiments, the end piece (57) of the second connector housing (8) can include a central pivot hole (60) configured to receive a pivot pin (61) centrally extending from the locking disk (59). The pivot pin (61) inserted into the central pivot hole (60) allows the locking disk (59) to rotate in adjacent relation to the end plate (57) of the second connector housing (8). In particular embodiments, a circumferential annular groove (62) can be disposed in the end plate (57) of the second connector housing (8) to receive one or more arcuate flanges (63) disposed in outwardly extending radially spaced apart relation on the circumference of the locking disk (59). The arcuate flanges (63) of the locking disk (59) can travel in the annular groove (62) of the second connector housing (8) upon rotation of the locking disk (59) around the pivot axis (64) of the pivot pin (61). The locking disk (59) can include a pair of locking disk apertures (65a, 65b) alignable with the pair of end plate apertures (58a, 58b) by rotation of the locking disk (59) between a nonaligned condition (66) in which the locking disk (59) covers the pair of end plate apertures (58a, 58b) in the second connector housing (8) and an aligned condition (67) in which the pair locking disk apertures (65a, 65b) align with the pair of end plate apertures (58a, 58b) in the end plate (57) of the second connector housing (8). The aligned condition (67) allows the male fitting (4) and the female fitting (5) to correspondingly pass through the pair of end plate apertures (58a, 58b) and the pair of locking plate apertures (65a, 65b) in the second connector housing retracted condition (10) of the second housing (8). The nonaligned condition (66) of the locking plate (59) covers the pair of end piece apertures (58a, 58b) and obstructs passage of the male fitting (4) and the female fitting (5) from passing through the pair of locking plate apertures (65a, 65b) and precludes movement of the second connector housing (8) to the retracted condition (10). Advantageously, this prevents or reduces contamination of the male fitting (4) and the female fitting (5) with contaminate materials (68).

In particular embodiments, the locking disk (59) can include biased rotatably coupling adjacent the end piece (57) of the second connector housing (8) which bias force (BF) urges the locking disk (59) toward the nonaligned condition (66) of the locking disk (59). In the example of FIGS. 6, 7 and 10A, a locking disk biasing member (69) in the form of a torsion spring (70) can have the torsion spring windings (70a) disposed around the locking disk pivot pin (61) with a torsion spring first end (70b) engaged to the end piece (57) of the second connector housing (8) and a torsion spring second end (70c) engaged with the locking disk (59). Rotation of the locking disk (59) toward the aligned condition (67) generates a biasing force (BF) in the torsion spring windings (70a) to urge the locking disk (59) toward the nonaligned condition (66); however, the locking disk biasing member (69) in the form of a torsion spring (70) does not obviate use of other structural forms of the locking disk biasing member (69).

Now, with primary reference to FIG. 10A, particular embodiments include a biasing disk (71) which can retain the locking disk biasing member (69). The biasing disk (71) can be disposed in adjacent fixed spatial relation to the end piece (57) of the second connector housing (8) to align a pair of biasing disk apertures (72a, 72b) with the pair of end piece apertures (58a, 58b). The fixed spatial relation can be achieved by insertion of biasing disk pegs (73) into corresponding biasing disk peg holes (74) in the end piece (57) of the second connector housing (8) to engage a torsion spring first end (70b) of the locking disk biasing member (71) to the second housing (8) and a torsion spring second end (70c) of the locking disk biasing member (69) to the locking disk (59). The locking disk biasing member (69) engaging the second connector housing (8) and the locking disk (59) affording a biasing force (BF) which moves the locking disk (59) toward the nonaligned condition (66).

Now, with primary reference to FIGS. 5A through 5G, in particular embodiments the locking disk (59) can include a plurality of locking tabs (75) each adjacent one of a corresponding plurality of locking tab slots (76) disposed in radially spaced apart on the circumferential margin of the locking disk (59). In the connector system (1), the plurality of locking tabs (75) of a first locking disk (59a) of a first connector (2a) can correspondingly insert into the plurality of locking tab slots (76) of second locking disk (59b) of a second connector (2b). The first connector (2a) can be rotated in a first direction (RFD) and the second connector (2b) can be rotated in an opposite second direction (RSD) (as shown by the arrows in the example of FIG. 1A). Opposite directional rotation of the first and second connectors (2a, 2b) can engage the plurality of locking tabs (75) of the first locking disk (59a) against the second locking disk (59b) and engages the locking tabs (75) of the second locking disk (59b) against the first locking disk (59a) to interlock the first locking disk (59a) of said first connector (2a) with the second locking disk (59b) of a second connector (2b) (as shown in the example of FIGS. 1A through 1G and 2 through 4).

Figure 4:
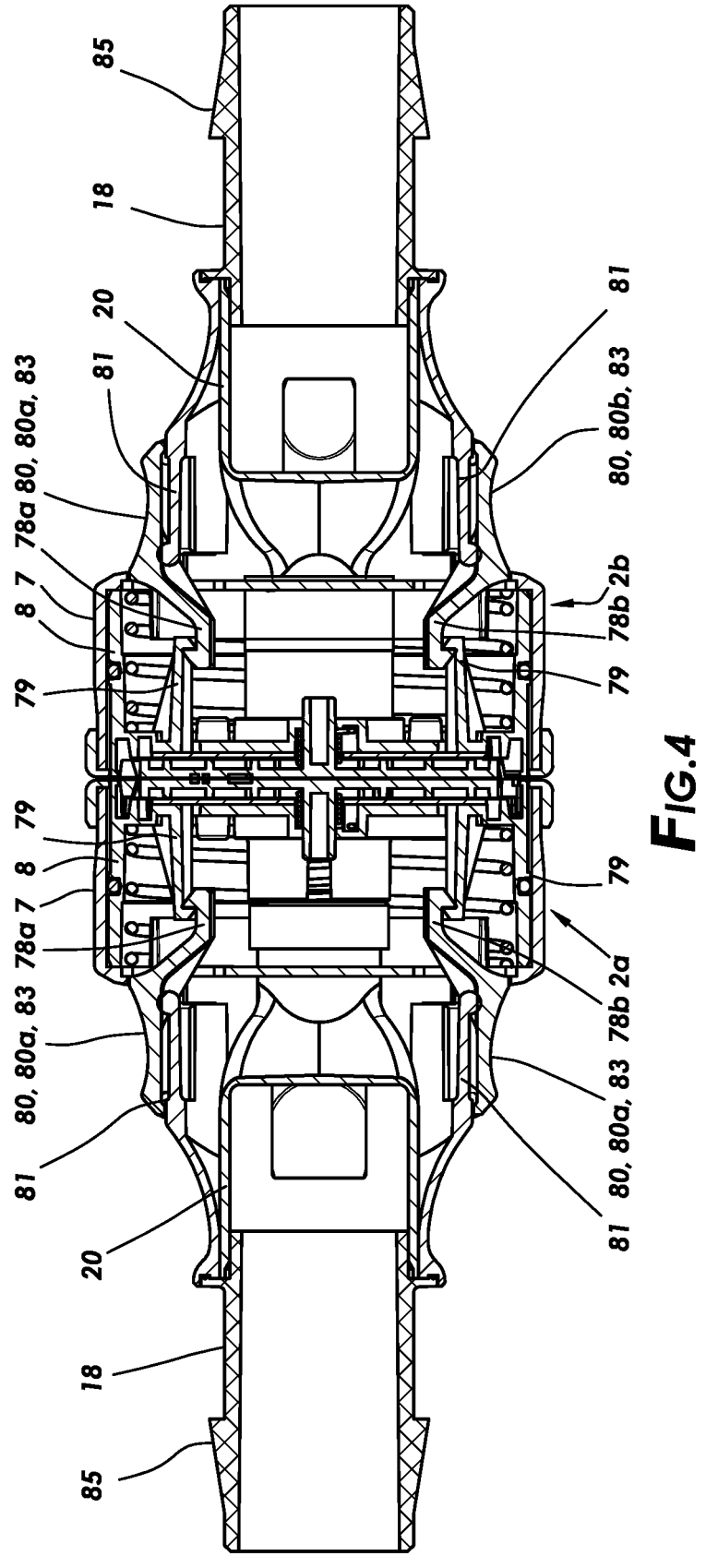
FIG. 4 is a cross-sectional view 4-4 of the particular embodiment of the connector system shown in FIG. 1D.

Now, with primary reference to FIGS. 1A through 1G, 2 through 4, the first connector (2a) interlocked with the second connector (2b) can be concurrently inwardly urged against the opposed biasing forces (BF1, BF2) to dispose the second connector housing (8a) of the first connector (2a) and the second connector housing (8b) of the second connector (2b) in the second connector housing retracted condition (10). As shown in FIGS. 2 through 4, as the second housing (8a) of the first connector (2a) and the second housing (8b) of the second connector (2b) move toward the second connector housing retracted condition (10), the male fitting (4) and female fitting (5) of the first connector (2a) and the male fitting (4) and the female fitting (5) of the second connector (2b) pass through the pair of locking disk apertures (65a, 65b) of the first connector (2a) and the pair of locking disk apertures (65a, 65b) of the second connector (2b). As shown in FIG. 3, the female fitting tubular body (40) of the female fitting (5) of the first connector (2a) and the second connector (2b) can respectively engage the male fitting second tubular body (25) of the male fitting (4) of the first connector (2a) and the second connector (2b) to respectively move the male fitting second tubular body (25) of the male fittings (4) toward the second tubular body retracted condition (29) to disengage the male fitting valve seals (33) from the male fitting valve seats (32) to dispose the male fittings (4) in the male fitting open condition (36). Concurrently, the male fitting valve body (34) of the male fitting (4) of the first connector (2a) and the second connector (2b) can respectively engage the female fitting valve body (42) of the female fitting (5) of the first connector (2a) and second connector (2b) to move the female fitting valve bodies (42) of the female fittings (5) toward the female fitting valve body retracted condition (45) to disengage the female fitting valve seal (51) from the female fitting valve seat (50) to dispose the female fittings (5) of the first connector (2a) and the second connector (2b) in the female fitting open condition (53). As shown in the examples of FIGS. 2 and 3, the first connector (2a) mated to the second connector (2b) provides a fluid transmission connection (6) to provide a fluid path (FP) through the first connector (2a) interlocked with the second connector (2b).

Now, with primary reference to FIGS. 1A-1D and FIG. 4, embodiments can include a catch (77) having a first catch part (78) coupled to the first connector housing (7) and a second catch part (79) coupled to the second connector housing (8), The first and second catch part (78, 79) can fasten in the second connector housing retracted condition (10) of said second housing (8) to maintain the second housing (8) in the second connector housing retracted condition (10). In particular embodiments, a catch release (80) can be integrated as a flexible member with the first connector housing (7) or can be pivotally coupled to the first connector housing (7). The catch release (80) can in a pressed condition (82) unfasten the first catch part (78) from the second catch part (79). In particular embodiments, the catch release (80) when pressed can engage a resilient leaf (81) extending from the first connector housing (7) below the catch release (80). The resilient leaf (81) engaged by the catch release (80) flexes to generate a catch release biasing force (BF3) to return the catch release (80) toward an unpressed condition (83) to maintain fastened engagement of the first catch part (78) with the second catch part (79).

As shown in the FIGS. 4, and 5A through 5C, particular embodiments can include a pair of catches (77a, 77b) each having a pair of first catch parts (78a, 78b) coupled to the first connector housing (7) and a pair of second catch parts (79a, 79b) coupled to the second connector housing (8). In particular embodiments, the pair of catches (77a, 77b) can be disposed in radial opposite relation on the first and second connector housings (7, 8). A pair of catch releases (80a, 80b) can be correspondingly coupled or pivotally coupled to the first connector housing (7) and to the pair of first catch parts (78a, 78b). The pair of catch releases (80a, 80b) can be concurrently operated to unfasten the pair of first catch parts (78a, 78b) from the pair of second catch parts (79a, 79b). A pair of resilient leaves (81a, 81b) can be correspondingly engaged by pressing a pair of catch releases (80a, 80b) and the pair of resilient leaves (81a, 81b) can each generate a catch release biasing force (BF) to return each of said pair of catch releases (80a, 80b) to toward an unpressed condition (83).

Now, with primary reference to FIG. 1, particular embodiments of the connector system (1) can, but need not necessarily, include a tube (84) coupled to a fluid inlet conduit (18). As one example, the fluid inlet conduit (18) can include a barb (85). The tube (84) can engage with the barb (85) to secure the tube (84) to the fluid inlet conduit (18); however, this not intended to preclude embodiments of the fluid inlet conduit (18) otherwise configured, such as a luer lock fitting, push to connect fitting, compression fitting, flare fitting, pneumatic fitting, or quick connect fitting, or combinations thereof.

Now, with primary reference to FIGS. 1A and 10, embodiments can be utilized to generate a fluid transmission connection (6) for the purpose of fluidically connecting a pair of tubes (84a, 84b) and to pass a fluid (86) through the fluid transmission connection (6). The fluid (86) can comprise a liquid or a gas or combination thereof.

Components of the connector system (1) can be formed from a numerous and wide variety of materials capable of providing a functional connector system (1). By way of examples, the material can include or consist of: steel, stainless steel, aluminum, brass, copper, rubber, plastic, plastic-like material, acrylic, polyamide, polyester, polypropylene, polyethylene, polyvinyl chloride, silicone, nylon, polybenzimidazole, polystyrene, polyvinyl chloride, polytetrafluoroethylene, polyester fiberglass, polyurethanes, epoxy resin, polyimides, cynate esters, polyoxybenzylmethylenglycolanhydride, melamine resin, polycyanurates, polyester resin, polyisoprene, polybutadiene, chloropene rubber, butyl rubber, styrene-butadiene rubber, nitrile rubber, ethylene propylene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, and combinations thereof. As to particular embodiments, one or more components of the connector system (1) can be formed from or include an antibacterial material (s), such as, polymers containing quarternary nitrogen atoms, aromatic groups, heterocyclic group, polyacrylamides, polyacrylates, polysiloxanes, polyionenes, polyoxazonlines, and combinations thereof. As to particular embodiments, one or more components of the connector system (1) can be formed entirety from non-metallic material(s).

Components of the connector system (1) can be produced from any of a wide variety of processes depending upon the application, such as press molding, injection molding, fabrication, machining, printing, additive printing, or the like, or combinations thereof, as one piece or assembled from a plurality of pieces into a component of the connector system (1).

As to particular embodiments, one or more components of the connector system (1) can be disposable or reusable, depending upon the application.

As can be easily understood from the foregoing, the basic concepts of the present invention may be embodied in a variety of ways. The invention involves numerous and varied embodiments of a genderless connector and methods for making and using such genderless connector.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "connector" should be understood to encompass disclosure of the act of "connecting"—whether explicitly discussed or not—and, conversely, were there is a disclosure of the act of "connecting", such a disclosure should be understood to encompass disclosure of a "connector" and even a "means for connecting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the connectors herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A connector system, comprising:
   a plurality of connectors, each including:
   a valve assembly including a bifurcate body having only one inlet conduit which bifurcates into a pair of fluid conduits,
   wherein one of said pair of fluid conduits terminating in a male fitting;
   wherein one of said pair of fluid conduits terminating in a female fitting, and
   wherein said male fitting and said female fitting of one of said plurality of connectors and said male fitting and said female fitting of another one of said plurality of connectors configured to directly mate with each other in a fluid transmission connection.

2. The connector system of claim 1, wherein each of said plurality of connectors further includes a connector housing, wherein a first connector housing of a first of said plurality of said connectors having telescoping engagement with a second connector housing of a second of said plurality of connectors, said first connector housing and said second connector housing operable between an extended condition and a retracted condition, said second connector housing including an end piece having a pair of apertures aligned with said male fitting and said female fitting, said male fitting and said female fitting configured to correspondingly pass through said pair of apertures of said second connector housing in said retracted condition of said second housing.

3. The connector system of claim 2, further comprising a first connector housing biasing member engaging said connector housing and said second connector housing affording a biasing force which moves said second connector housing toward said extended condition of said second connector housing.

4. A connector, comprising:
   a first connector housing including a valve assembly defining a pair of fluid conduits, one of said pair of fluid conduits terminating in a male fitting and one of said pair fluid conduits terminating in a female fitting;
   a second connector housing having telescoping engagement to said first connector housing between an extended condition and a retracted condition, said second connector housing including an end piece having a pair of apertures aligned with said male fitting and said female fitting, said male fitting and said female fitting configured to correspondingly pass through said pair of apertures of said second connector housing in said retracted condition of said second housing; and
   a locking disk having a pair of apertures, said locking disk rotatably coupled to said end piece of said second housing between a nonaligned condition covering said pair of apertures in said second connector housing and an aligned condition aligning said pair of apertures in said locking disk with said pair of apertures in said end piece of said second connector housing, said male fitting and said female fitting configured to correspondingly pass through said pair of apertures in said second connector housing and in said locking disk in said aligned condition of said locking disk and in said retracted condition of said second housing.

5. The connector of claim 4, further comprising a locking disk biasing member engaging said end piece of said second connector housing and said locking disk to afford a biasing force which moves said locking disk toward said nonaligned condition of said locking disk.

6. The connector of claim 4, further comprising a biasing disk which retains a locking disk biasing member, said biasing disk disposed in fixed spatial relation to said end piece of said second connector housing to engage a locking disk biasing member first end with said end piece of said second connector housing and to engage a locking disk biasing member second end with said locking disk, said locking disk biasing member engaging said end piece of said second connector housing and engaging said locking disk affording a biasing force which moves said locking disk toward said nonaligned condition of said locking disk.

7. The connector of claim 4, wherein said locking disk includes a plurality of locking tabs adjacent a corresponding plurality of locking tab slots disposed in radially spaced apart relation on a circumferential margin of said locking ring, said plurality of locking tabs of a first locking disk of a first connector configured to correspondingly insert into and rotate within said plurality of locking tab slots of second locking disk of a second connector to interlock said first locking disk of said first connector to said second locking disk of a second connector.

8. The connector of claim 7, wherein rotation of said first connector and said second connector having said first locking disk of said first connector interlocked to said second locking disk of a second connector in opposite directions achieves said aligned condition of said pair of locking disk apertures in each of said first and second locking disk of said first and second connectors.

9. The connector of claim 8, wherein said second connector housing of said first and second connector each disposed in said second connector housing retracted condition allows passage of said male and female fittings of said first and second connectors through respective said pair of locking disk apertures of said first and second locking disks.

10. The connector of claim 9, wherein said male fittings of said first and second connector correspondingly engage said female fittings of said first and second connector to afford said fluid transmission connection.

11. The connector of claim 10, further comprising a catch having a first catch part coupled to said first connector housing and a second catch part coupled to said second connector housing, said first and second catch parts fasten in said retracted condition of said second housing to maintain said open condition of said fluid transmission connection.

12. A connector system, comprising:
a plurality of connectors each having a substantially identical connector structure,
wherein said plurality of connectors each having said substantially identical connector structure, including:
a connector housing defining a pair of fluid conduits,
a first one of said pair of fluid conduits terminating in a male fitting, a second one of said pair of fluid conduits terminating in a female fitting, including:
a female fitting tubular body including a female fitting valve seat;
a female fitting valve body including a female fitting valve seal telescopingly engaged inside said female tubular body,
said female fitting valve body telescopingly moves to engage said female fitting valve seal to said female fitting valve seat in a closed condition of said female fitting,
said female fitting valve body telescopingly moves to disengage said female fitting valve seal from said female fitting valve seat in an open condition of said female fitting; and
a female fitting biasing member engaging said female fitting tubular body and said female fitting valve body to afford a biasing force toward said closed condition of said female fitting,
whereby any pair of said plurality of connectors includes a male fitting of a first one of said pair which mates in fluid transmission with a female fitting of said second one of said pair of plurality of connectors and a male fitting of said second one of said pair of connectors mates in fluid transmission with a female fitting of said first one of said plurality of connectors.

13. The connector system of claim 12, wherein each of said male fitting comprising:
a male fitting first tubular body having a first tubular body internal surface and having a first tubular body external surface;
a male fitting second tubular body having a second tubular body internal surface and a second tubular body external surface,
said second tubular body internal surface telescopingly engaged to said first tubular body external surface,
a first male fitting valve seal coupled by at least one support to said first tubular body a distance from a first tubular body end opening;
a male fitting valve seat coupled to said second tubular body internal surface,
wherein said male fitting second tubular body telescopingly moves to engage said male fitting valve seat to said male fitting valve seal in a closed condition of said male fitting and telescopingly moves to disengage said male fitting valve seat from said male fitting valve seal in an open condition of said male fitting; and
a male fitting biasing member engaging said male fitting first tubular body and said male fitting second tubular body, said male fitting biasing member affording a biasing force toward said closed condition of said male fitting.

14. A connector, comprising:
a first connector housing having only one fluid inlet conduit; and
a valve assembly in fluid communication with said only one fluid inlet of said first connector housing,
said valve assembly defining a pair of fluid conduits,
wherein one of said pair of fluid conduits terminating in a male fitting, said male fitting including:
a male fitting first tubular body having a first tubular body internal surface and having a first tubular body external surface;

a male fitting second tubular body having a second tubular body internal surface and a second tubular body external surface, said first tubular body internal surface defining said first one of said pair of fluid conduits, said second tubular body internal surface having biased telescoping engagement to said first tubular body external surface, a male fitting valve body having a male fitting valve seal, said male fitting valve body supported by said first tubular body a distance from a first tubular body open end; and a male fitting valve seat coupled to said second tubular body internal surface, said biased telescoping engagement generates a biasing force to move said male fitting valve seat to engage said male fitting valve seal in a closed condition of said male fitting, wherein one of said pair of fluid conduits terminating in a female fitting, wherein said male fitting and said female fitting configured to mate in a fluid transmission connection.

15. The connector of claim 14, further comprising a male fitting biasing member engaging said male fitting first tubular body and said male fitting second tubular body, said male fitting biasing member affording a biasing force toward said closed condition of said male fitting.

16. The connector of claim 14, wherein said female fitting including:

a female tubular body including a female fitting valve seat;

a female valve body including a female fitting valve seal, said female valve body having biased telescoping engagement inside said female tubular body, said biased telescoping engagement generates a bias force to move said female fitting valve seal to engage said female fitting valve seat in a closed condition of said female fitting.

17. The connector of claim 16, further comprising a female fitting biasing member engaging said female fitting tubular body and said female fitting valve body to afford a biasing force toward said closed condition of said female fitting.

18. The connector of claim 16, wherein a male fitting of a first connector and a male fitting of a second connector correspondingly engage a female fitting of said first connector and a female fitting of said second connector, said female tubular body of each said female fitting correspondingly engaging said second tubular body of each said male fitting to overcome said biasing force to move said second tubular body to disengage said male fitting valve seat from said male fitting valve seal;

said male fitting valve body engaging said female valve body to overcome said biasing force to move said female fitting valve seal from said female fitting valve seat to generate the open condition of each said female fitting, and each said male fitting and each said female fitting in said open condition provide said fluid transmission connection.

* * * * *